United States Patent
Yano

(10) Patent No.: US 9,672,452 B2
(45) Date of Patent: Jun. 6, 2017

(54) IMAGE FORMING APPARATUS

(71) Applicant: CANON KABUSHIKI KAISHA, Tokyo (JP)

(72) Inventor: Yuzuru Yano, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/670,771

(22) Filed: Mar. 27, 2015

(65) Prior Publication Data
US 2015/0278659 A1 Oct. 1, 2015

(30) Foreign Application Priority Data
Mar. 31, 2014 (JP) .................................. 2014-071949

(51) Int. Cl.
*G06K 15/02* (2006.01)

(52) U.S. Cl.
CPC .................................. *G06K 15/1843* (2013.01)

(58) Field of Classification Search
None
See application file for complete search history.

(56) References Cited

U.S. PATENT DOCUMENTS

| | | | |
|---|---|---|---|
| 2005/0146596 A1* | 7/2005 | Nihei | G06K 15/1219 347/239 |
| 2005/0200930 A1* | 9/2005 | Kanno | G02B 26/122 359/216.1 |
| 2008/0089585 A1* | 4/2008 | Yashima | H04N 1/393 382/173 |
| 2011/0286011 A1* | 11/2011 | Shoji | H04N 1/3935 358/1.1 |
| 2012/0147403 A1* | 6/2012 | Nakamura | G06K 15/1219 358/1.13 |
| 2013/0027501 A1* | 1/2013 | Yano | B41J 2/471 347/247 |
| 2013/0070308 A1* | 3/2013 | Kurigata | H04N 1/393 358/451 |

* cited by examiner

*Primary Examiner* — Dung Tran
(74) *Attorney, Agent, or Firm* — Fitzpatrick, Cella, Harper & Scinto

(57) ABSTRACT

An image forming apparatus which can reduce the required number of line buffers and random number generation circuits when performing a magnification changing process in a band process. The CPU 51 determines a range of a random number value (random number value rnd) which is generated by a random number generator, based on the scanning width (band process width d) and the length in a sub-scanning direction of an area (sub-scanning length ay). The CPU 51 receives a random number (random number value rnd), which is in the above range, and performs image processing in which a pixel is inserted or deleted at the position determined by the received random number (random number value rnd).

6 Claims, 19 Drawing Sheets

FIG. 6

|  | vacnt(0) | vacnt(1) | vacnt(2) | vacnt(3) |
| --- | --- | --- | --- | --- |
| 1ST SCAN | 0 | 1 | 2 | 3 |
| 2ND SCAN | 4 | 5 | 6 | 7 |
| 3RD SCAN | 8 | 9 | 0 | 1 |
| 4TH SCAN | 2 | 3 | 4 | 5 |
| 5TH SCAN | 6 | 7 | 8 | 9 |
| 6TH SCAN | 0 | 1 | 2 | 3 |
| 7TH SCAN | 4 | 5 | 6 | 7 |
| 8TH SCAN | 8 | 9 | 0 | 1 |

IMAGE FORMING APPARATUS

BACKGROUND OF THE INVENTION

Field of the Invention

The present disclosure relates to an image forming apparatus which forms an image with an electrostatic latent image.

Description of the Related Art

In an image forming apparatus which forms an image with an electrostatic latent image, there is a problem that the image size of the image formed on the transferring member differs from that of the image originally intended. This is due to the fact that the size of the image is influenced by the variation in the attachment position and/or heat generated at the time of fixing the formed image.

For such a problem, US2008/089585 (A1) discloses an image forming apparatus which compares an image size of the output image with that of an originally intended image; and measures the magnification in the formation process of the image based on the comparison result. Then, the apparatus performs a correction for the image data of the input image at the measured magnification, and forms an image, based on the corrected image data after the correction. As a result, an image having originally intended size is finally output.

For example, in some image forming apparatuses, when an image formation is performed, an image size of an output image may be 101[%] of that of an input image in a sub-scanning direction (i.e., a rotating direction of a photoreceptor). In this case, in order to output an image having the same image size as an input image, the image data is corrected so that the image formation is performed in the image size obtained by multiplying the original image size by the reciprocal of the measured magnification. Specifically, an image having an image size multiplied by 0.990099 (i.e., reciprocal of 101[%]=100/101[%]) in the sub-scanning direction is formed. As a result, the image size of the output image becomes 1.010101 . . . *99[%]=100[%] in a main scanning direction, and becomes 0.990099*101[%]=100[%] in the sub-scanning direction.

In the magnification changing method of the input image data in the image processing device described in US2008/089585 (A1), the number of pixels, which corresponds to the difference of the image size of the output image being output without correction and the desired image size in the sub-scanning direction, is calculated. Then, based on the number of pixels, an image area is divided, in the sub-scanning direction, into a plurality of areas. FIG. 15 is a diagram schematically illustrating the input image to be processed. The input image illustrated in FIG. 15 is a set of pixels arranged in the main scanning direction and in the sub-scanning direction. For example, suppose that the difference of the desired image size and the size of the output image output without correction is 10 pixels. In this case, as illustrated in the dotted line in FIG. 15, an input image is divided into 10 areas along the sub-scanning direction. Further, for each divided area, based on a random number value generated by a random number generator, one random position is determined for every coordinate position (main scanning position) in a main scanning direction. Even in the same area, the random positions may differ depending on the sub-scanning position. At the determined random position, a pixel is inserted when enlarging the image size in the sub-scanning direction, and a pixel is deleted when reducing the image size. When a pixel has been inserted, then a pixel positioned at one-line behind the determined random position in the sub-scanning direction is output. This is called "delayed output". When a pixel has been deleted, then a pixel positioned at one-line advanced of the determined random position in the sub-scanning direction is output. This is called "advanced output". These "delayed" and "advanced" states, which are generated by the insertion or the deletion of a pixel, will be initialized upon changing of the area.

FIG. 16 is, for a certain area, a schematic diagram for visualizing and representing the random position determined based on the random number value generated by a random number generator. As illustrated in FIG. 16, the coordinate value representing the main scanning position of the area is "x", and the coordinate value representing a line number (sub-scanning position) is "y." In FIG. 16, the dotted lines which are parallel to the main scanning direction are boundary lines (area boundaries) of areas, and are equivalent to the dotted lines illustrated in FIG. 15. For example, when enlarging the image size of an input image in the sub-scanning direction, a pixel is inserted at a determined random position. Because of inserting a pixel, an image as illustrated in FIG. 17A (the image before enlarging) is, as illustrated in FIG. 17B, output with its image size expanded by a correction process (enlarging process). This correction process is a magnification changing process in which the image size is enlarged by one line in the sub-scanning direction in one area. When reducing the image size in the sub-scanning direction, a pixel is deleted in the determined random position. As a result of deleting a pixel, the image as illustrated in FIG. 17C (the image before reduction) is output with its image size being reduced by the correction process (reducing process), as illustrated in FIG. 17D. This correction process is a magnification changing process in which the image size is reduced by one line in the sub-scanning direction in one area.

Some image forming apparatuses includes a frame buffer for storing image data. In this case, the magnification changing process in the sub-scanning direction is performed by performing a correction process for the input image data stored in the frame buffer. In addition, a band process is also employable as another method for storing image data. By employing the band process, the amount of a line memory (line buffer) in the image forming apparatus is minimized. Therefore, an expensive frame buffer is not necessary for the image forming apparatus, and reduction of the manufacture cost of the image forming apparatus can be achieved.

Here, details of the band process will be described. FIG. 18 is a diagram schematically illustrating the input image. In the input image illustrated in FIG. 18, 14 pixels are arranged in the main scanning direction, 20 pixels are arranged in the sub-scanning direction, and one square represents one pixel. The character illustrated in each square is provided for distinguishing, for convenience, the position in the sub-scanning direction for each pixel before performing the correction process. As to a band process, it is a process for reading, from the image data representing the whole input image, a predetermined number of lines (i.e., band processing width) in the image data, and performing image processing on the read image data. In this process, reading out of the image data and image processing for the read data are repeatedly performed until the process for the whole input image is completed. As an example, in the input image illustrated in FIG. 18, if the number of lines read by one scan is four lines, as illustrated in FIG. 19, the image data consisting of 4 lines is output for every scan (i.e., scan 1 to scan 5 in FIG. 19). Whole input image (FIG. 18) will be completed by repeating 4-line reading total of 5 times, since there are 20 lines in the sub-scanning direction.

For example, when performing a magnification changing in the sub-scanning direction in a band process which reads 4 lines at a time, generally, the number of a line buffer required for this case is 5. For each area and for each main scanning position, the number of a random position for inserting or deleting a pixel is one. Therefore, when enlarging the image size, what is necessary is to prepare, for the random position, one additional line which is just behind the present line. Further, when reducing the image size, what is necessary is to prepare, for the random position, one additional line which is adjacent and advancing the present line. As an example, description is given where a magnification changing process is performed on the image data output of scan 2 illustrated in FIG. 19.

FIG. 20 is a figure for explaining the number of line buffers required for a magnification changing process (the number of lines). When a pixel is inserted in the line at the sub-scanning position A as illustrated in FIG. 20, for example, the line data of the sub-scanning position X which is the last line in the scan 1 (FIG. 19) is needed. When deleting a pixel in the line of sub-scanning position D, the line data of sub-scanning position Y which is a line of the first line in the scan 3 (FIG. 19) is needed. Since the magnification changing process is one of an enlarging process or reducing process, the required number of line buffers is 5 (i.e., the sum of 4 and 1).

However, when the band process is performed in the scan including the area boundary of each divided area, the number of line buffers may exceed "band process width+1" and two random number generators may be needed. Details of this case will be specifically described as below. FIG. 21 illustrates a portion of an input image having 9 pixels for the length (sub-scanning area length) of the sub-scanning direction of an area. The dotted lines in FIG. 21 illustrates the boundary lines of areas, and an area boundary is defined between pixel X (character in a square is "X") and pixels 1 (character in a square is "1"), between pixel 9 (character in a square is 9) and pixels 1, and between pixel 9 and pixel Y (character in a square is "Y"). In FIG. 21, seen from a front side, the upper area is defined as "area A" and downward area is defined as "area B". Hereinafter, description is given where the magnification changing process for reducing the image size is performed, with 4 lines band width, on the area A and the area B.

FIG. 22 illustrates, in the area A and the area B illustrated in FIG. 21, a state in which random positions, at which a pixel is deleted, are specified. FIG. 23 illustrates the result of deleting pixels at the positions illustrated in FIG. 22, i.e., the result of performing the magnification changing process for reducing the image size. The positions of the shaded square illustrated in FIG. 23 represent the positions at which a pixel is deleted in the magnification changing process for reduction. In FIG. 23, each of the areas A and the area B is reduced by one line in the sub-scanning direction in the magnification changing process, as a result, the sub-scanning area length is reduced from 9 pixels to 8 pixels.

Figure 24:
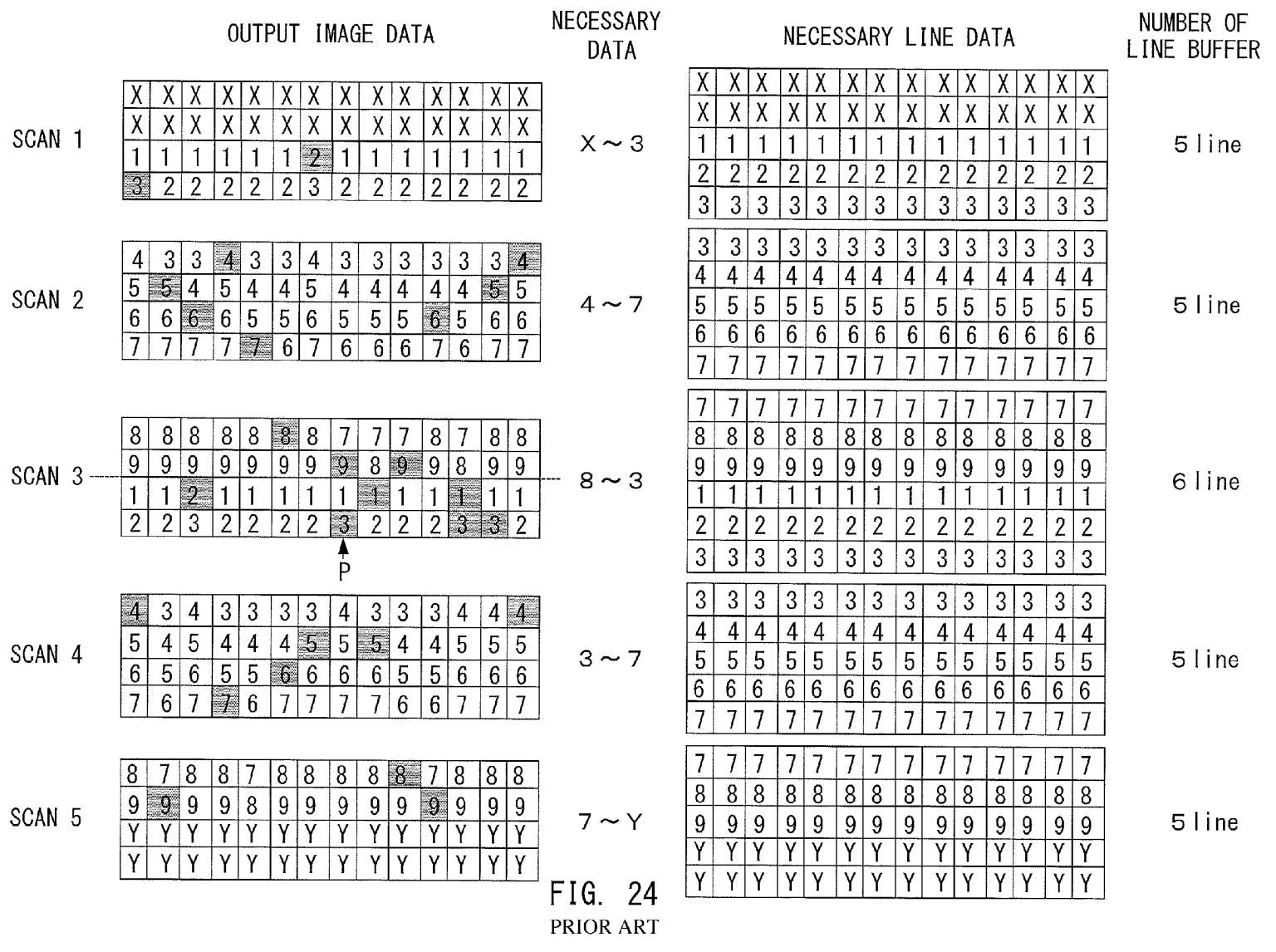

FIG. 24 illustrates: 1) an output image data (from scan 1 to scan 5) when the band process is performed on the image illustrated in FIG. 23 with band width being 4 lines; and 2) line data and the number of the line buffers required for the magnification changing process. Following description is given in a case where the magnification of the sub-scanning direction of an image forming apparatus is small enough and the cycle of the insertion or the deletion of a pixel is longer than the band process width. Specifically, in a case where the band process width is four lines, in the magnification changing rate, the cycle of the insertion or the deletion of a pixel is more than or equal to four lines. As to the magnification in which frequency of insertion of a pixel is one per 4 lines, since image data consisting of 4 lines is changed into image data consisting of 5 lines, the magnification is 5/4=1.25. Therefore, the magnification changing rate is 125[%]. Further, as to the magnification in which the deletion of a pixel occurs once per 4 lines, since image data consisting of lines is changed into image data consisting of 3 lines, the magnification is 3/4=0.75. Therefore, the magnification changing rate is 75[%]. In the following, description is given assuming that the magnification changing rate is in the range of 75[%] to 125[%]. It is noted that the range of the magnification changing rate frequently used in a known image forming apparatus is 99[%] to 101[%]. The above-mentioned magnification range may differ in the image forming apparatus with a different band process width. However, even in the case, the band process width is about 32 lines at the maximum, therefore, as compared to the range of 99[%] to 101[%], the above mentioned range of 75[%] to 125[%] is sufficiently wide.

As illustrated in FIG. 24, in scan 1, scan 2, scan 4, and scan 5, the required number of the line buffers is five. However, in scan 3, as illustrated, the required number of line buffers is six. Among scans 1 to 5, only in scan 3, the required number of line buffers increases one. This is due to the fact that scan 3 is performed over the area A and the area B for performing the band process on these lines. Usually, for each main scanning position, the insertion or the deletion of a pixel occurs once for every scan.

However, in a scan over two or more areas, Depending on the combination of 1) the random number value used for the process of the area A; and 2) the random number value used for the process of the area B, in the same main scanning position, the insertion or the deletion of a pixel may occur twice. For example, in the main scanning position P of scan 3 illustrated in FIG. 24, the deletion of a pixel has occurred twice. When performing the band process on the line over the area A and area B, a random number value should be generated for each of the area A and the area B. Further, the generated random number values must be stored. Therefore, both line buffers for image processing for a scan over the areas and two random number generators should be previously provided in an image forming apparatus. Therefore, there remains a problem that the manufacturing cost of an image forming apparatus is increased.

The present disclosure is directed to provide an image forming apparatus which can reduce the required number of line buffers and random number generation circuits when performing a magnification changing process in a band process.

SUMMARY OF THE INVENTION

An image forming apparatus of the present disclosure includes a dividing unit configured to divide received image data into two or more areas; a random number generation unit configured to generate a random number value for specifying a position for inserting or deleting a pixel for each divided area; a determination unit configured to determine a range of a random number value generated by the random number generation unit based on a scanning width of in a scan of the image data in a main scanning direction and a length in a sub-scanning direction of the area; and an image processing unit configured to perform image processing for inserting or deleting a pixel in the specified position specified by the random number value within the determined range.

Further features of the present invention will become apparent from the following description of exemplary embodiments (with reference to the attached drawings).

BRIEF DESCRIPTION OF THE DRAWINGS

FIG. 6 is a schematic diagram illustrating stored data in line buffers before and after performing each process of steps S511 to S515.

FIG. 7 is a diagram illustrating a process of change of a counter vacnt for each scan.

FIG. 24 is a diagram illustrating, in case a band process is performed, output image data, required line data, and the number of line buffers.

DESCRIPTION OF THE EMBODIMENTS

[First Embodiment]

Figure 1:
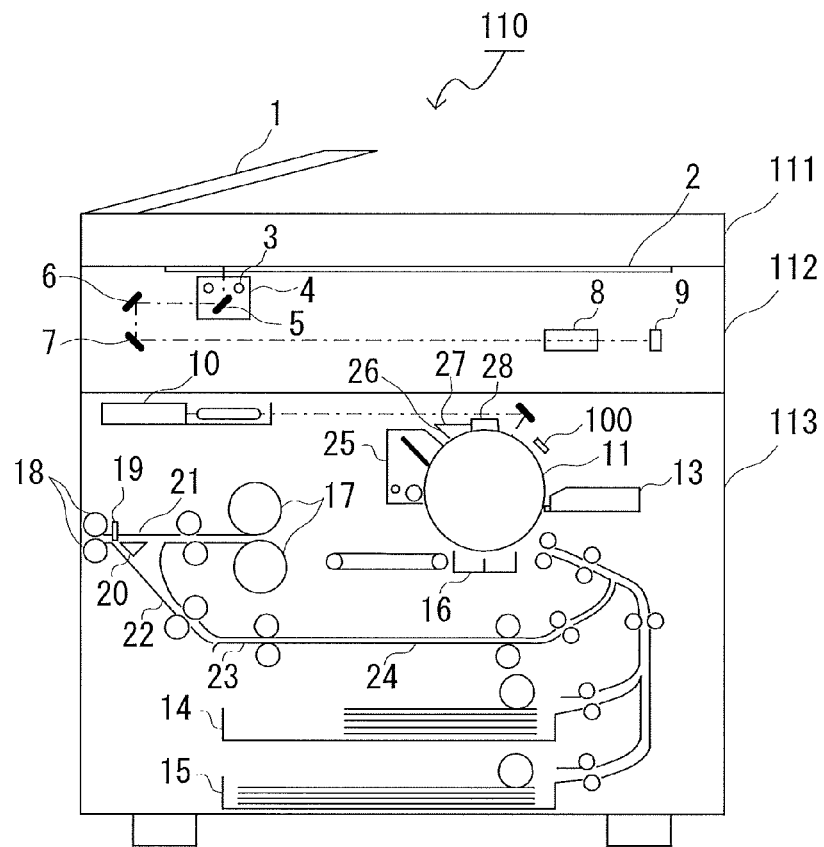
FIG. 1 is a schematic sectional view of an image forming apparatus.

Now, hereinafter, an embodiment of this invention will be described with reference to the accompanying drawings. FIG. 1 is a schematic longitudinal sectional view of an image forming apparatus according to the present embodiment. The image forming apparatus 110 includes a document feeding unit 111 for feeding documents to a predetermined reading portion, image reading unit 112 for reading the fed documents, and an image forming unit 113 for forming an image based on image data. It is noted that the image forming apparatus 110 has two modes, i.e., a copy mode and a printer mode. In a copy mode, the image forming apparatus 110 receives image signal (image data) which is read and obtained by image reading unit 112, and prints the received image data. In a printer mode, the image forming apparatus 110 receives image signal (image data) which is output from external PC 48, which is described later, and prints the received image data. Hereinafter, with reference to FIG. 1, basic operations of an image forming apparatus 110 is explained.

In the copy mode, the documents on a document feeder 1 of the document feeding unit 111 is fed one by one onto a document glass plane 2 of the image reading unit 112. After feeding a document, a lamp 3 provided on a scanner unit 4 of the image reading unit 112 is lit to irradiate light on a surface of the document, and the scanner unit 4 moves in the sub-scanning direction. The reflected light from the surface of the document passes through a condensing section 8 via mirrors 5 and 7, which are provided on a scanner unit 4, then, the reflected light is input to the an image sensor 9. The image sensor 9 converts the reflected light into an image signal (image data), and outputs the obtained image data to an exposure control unit 10 of an image forming unit 113. In the printer mode, the image data received from the external PC 48 is output to the exposure control unit 10.

The exposure control unit 10 controls a laser drive device provided thereon to generate a laser beam according to the received image data. The latent image formed by irradiation of the laser beam on a photoreceptor 11 is monitored by a potential sensor 100 to determine whether the potential on the photoreceptor 11 is a desired value or not. If the monitored value is a desired value, a development unit 13 performs development. The photoreceptor 11 is rotated to be in synchronism with the exposure control unit 10 for every output line of exposure control unit 10. Further, the photoreceptor 11 forms an image by repeating a one-way line scan. In accordance with latent image forming timing, a transfer member is conveyed from a transfer member tray 14 or 15, and, in a transferring unit 16, the developed toner image as described above is transferred on the surface of the transferring member. The transferred toner image is fixed on the transferring member by a fixing unit 7, and the transferring member is discharged from a pair of discharge rollers 18 to the exterior of the image forming apparatus. The surface of the photoreceptor 11 is, after the transfer, cleaned by a cleaner 25. The cleaned surface of the photoreceptor 11 is neutralized with an auxiliary electrification unit 26, and is adjusted by a primary electrification unit 28 to obtain proper electrification. Then, the remaining electric charge on the photoreceptor 11 neutralized by an exposure lamp 27, and the surface of the photoreceptor 11 is electrified by the primary electrification unit 28. The image forming apparatus 110 repeats the image forming processing by the following configuration.

When forming image on both sides of the transferring member, after an image was formed on the surface of the transferring member, when the back end of the transferring member conveyed from the fixing unit 17 is detected by a sheet detection unit 19, the rotation of the pair of discharge roller is stopped. A flapper 20 provided in an ejection passage 21 switches a passage for the transferring member to a reversal passage 22. Then, the rotation direction of the discharge roller pair 18 is reversed and the transferring member is conveyed to the reversal passage 22. The transferring member is conveyed via a reversal conveyance path entrance 23 from the reversal passage 22 to reversal conveyance path 24. The transferring member is again conveyed from the reversal conveyance path 24 to the transferring unit 16, and an image is formed on the back of the transferring member as described in the above mentioned image forming operation.

Figure 2:
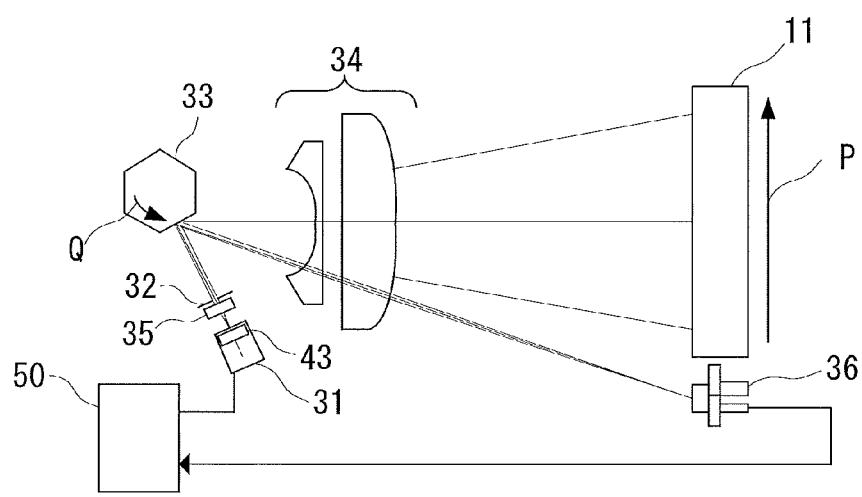
FIG. 2 is a diagram illustrating a configuration of an exposure control unit and photoreceptor.

FIG. 2 is a configuration diagram illustrating the exposure control unit 10 and the photoreceptor 11. Exposure control unit 10 and photoreceptor 11 exposure control unit 10 include a semiconductor laser 43, laser drive device 31, diaphragm 32 and rotating polygon mirror (hereinafter described as "polygon mirror") 33, f-θ lens 34, collimating lens 35, and beam detection sensor (herein after described as "BD sensor") 36. The exposure control unit 10 also includes an image processing unit 50. The exposure control unit 10 exposes the surface of the photoreceptor 11 by scanning the laser beam, which is pulse width modulated according to the image data, in a main scanning direction.

The image data received from the image sensor or the external PC 48 is input to the image processing unit 50. The image processing unit 50 performs PWM (pulse width modulation) table conversion on the image data according to the imaging mode of the image forming unit 110, and outputs the resulting data as a laser drive signal to the laser drive device 31. The laser drive device 31 receives a laser drive signal from the image processing unit 50, and drives the semiconductor laser 43 based on the laser drive signal.

Provided inside the semiconductor laser 43 is a PD (photo-diode) sensor (not shown) for detecting a part of a laser beam. The image processing unit 50 performs auto power control for a laser diode based on the detection signal of PD sensor. The laser beam emitted from the semiconductor laser 43 is adjusted, by the collimating lens 35 and the diaphragm 32, to be substantially parallel light. Then, the laser beam enters into the polygon mirror 33 with a predetermined beam diameter. The polygon mirror 33 is driven by a driving device (not shown) to rotate with a constant angular velocity in the direction illustrated by an arrow Q in FIG. 2. With this rotation, the entered laser beam is reflected to be a deviation beam, and the angle of which is continuously displaced.

The deviation beam is condensed with f-θ lens 34. At this time, F-θ lens 34 corrects distortion aberration of a deviation beam in that case. Therefore, the deviation beam is scanned at a constant velocity in the direction of the arrow P on the photoreceptor 11, which serves as an image support object. BD sensor 36 detects the reflected light from polygon mirror 33. The detection signal which is output from the BD sensor is a synchronization signal (main scanning synchronization signal) for synchronizing the rotation of polygon mirror 33 and the writing of image data for keeping the image formation position in the main scanning direction constant.

Through the processes described above, an image is formed on the surface of the transferring member. Upon forming an image, heat is applied when fixing the transferred toner image in the fixing unit 17. However, the transferring member may be expanded or reduced by this heat. The elastic rate of the transferring member mainly depends on the constituent material of the transferring member. Therefore, for example, by specifying the type of transferring member by a user before printing, and performing a magnification changing process by the image processing unit 50 at a reciprocal of the elastic rate according to the specified type image, the expansion or reduction of the material can be compensated. Specification of the type of transferring member can be performed via the external PC 48 or via a control panel 49 described later, for example.

Figure 3:
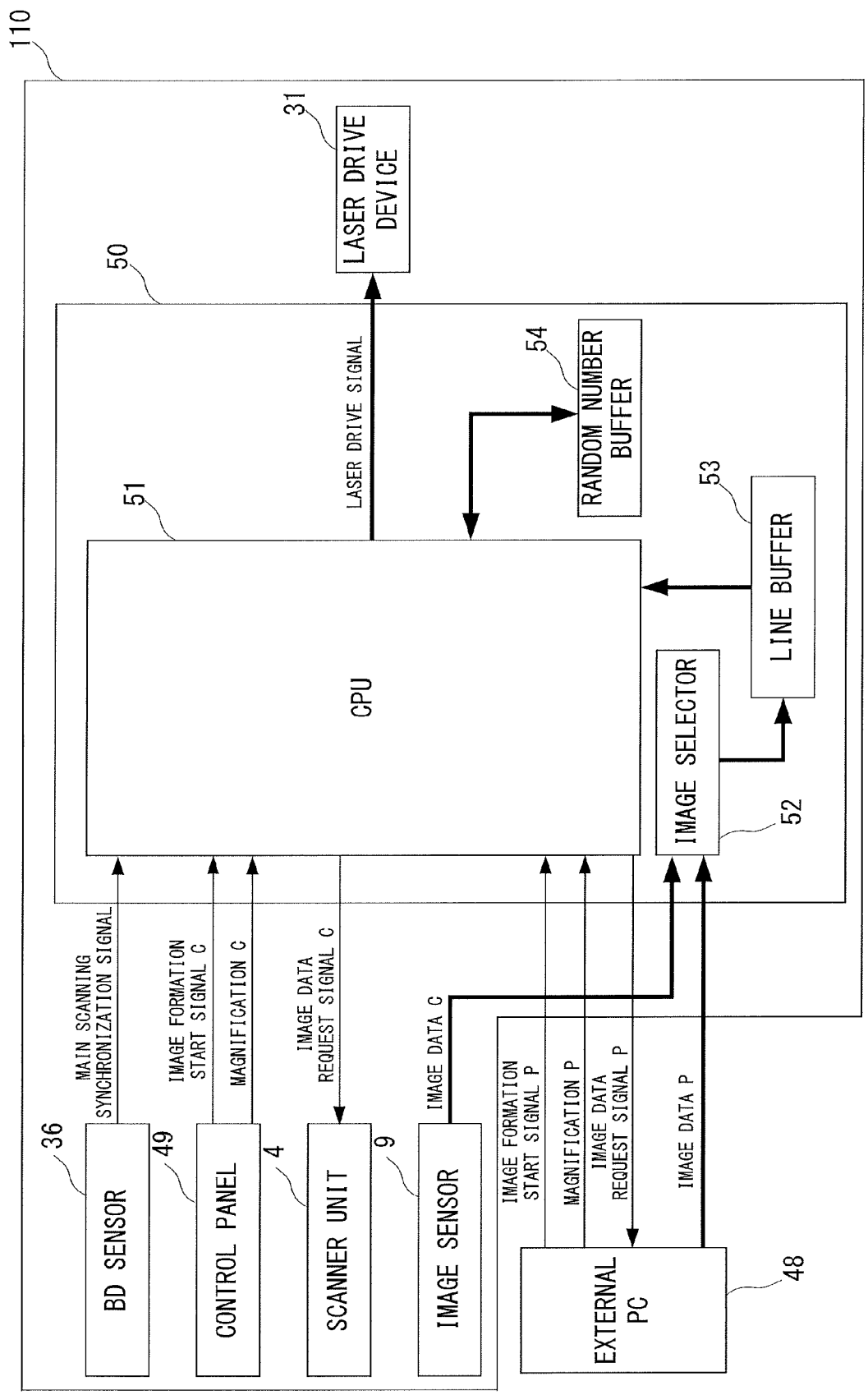
FIG. 3 is a block diagram illustrating a configuration example of an image processing unit and its peripherals.

FIG. 3 is a block diagram illustrating a configuration example of an image processing unit 50 and its peripherals. The image processing unit 50 includes a CPU (Central Processing Unit) 51, an image selector 52, a line buffer 53, and a random number buffer 54. The image processing unit 50 is connected to the scanner unit 4, the image sensor 9, the BD sensor 36, the external PC 48, the control panel 49, and the laser drive device 31. The CPU 51 controls each constitution devices included in the image processing unit 50 and the image forming unit 110. The image selector 52 selects image data to receive depending on the mode, i.e., the copy mode or the printer mode. Specifically, in the copy mode, the image selector 52 operates to select image data C which is output from the image sensor 9, as illustrated in FIG. 3. In the printer mode, the image selector 52 operates to select image data P which is output from the external PC 48, as illustrated in FIG. 3. The line buffer 53 stores image data of a predetermined line. The random number buffer 54 stores the random number values for one area generated by the CPU 51.

In response to receipt of a print start instruction from a user, the external PC 48 outputs an image formation start signal P. Further, the external PC 48 outputs a magnification P set by the user. The magnification P is set by the user when performing reduced printing with a magnification of 90%, or enlarged printing with a magnification of 110%, for example. In response to receipt of an image data request signal P from the CPU 51, the external PC 48 outputs image data P for a single line. In response to receipt of a copy start instruction from a user, the control panel 49 outputs an image formation start signal C. Further, the control panel 49 outputs a magnification C set by the user. The magnification C is set by the user when performing reduced printing with a magnification of 90%, or enlarged printing with a magnification of 110%, for example. In response to receipt of an image data request signal C from the CPU 51, the scanner unit 4 moves in the sub-scanning direction for outputting image data for a single line from the image sensor 9.

Now, description is made for the movement in the sub-scanning direction of scanner unit 4, in the exemplary case where the resolution of the image forming unit 110 is 600 [dpi]. With the resolution of 600 [dpi], the width of a line is obtained by 25.4 [mm]/600 [dpi]. In this case, the width of a line is 0.04233 [mm]. If a scanner unit 4 have moved 0.04233 [mm] in the sub-scanning direction, it means that the scanner unit 4 have moved a distance corresponding to the width of a line in case of resolution 600 [dpi]. The image sensor 9 converts a result of a scan at the position after the movement into an image signal. The converted image signal is output as the image data C. It is noted that the image data request signal C and the image data request signal P are generated two or more times during imaging operations for 1 page. For example, when the whole page of 210 [mm] is imaged in the sub-scanning, the demand signal occurs 210 [mm]/0.04233 [mm] 4960 [times]. The timing of occurrence will be described later.

Figure 4:
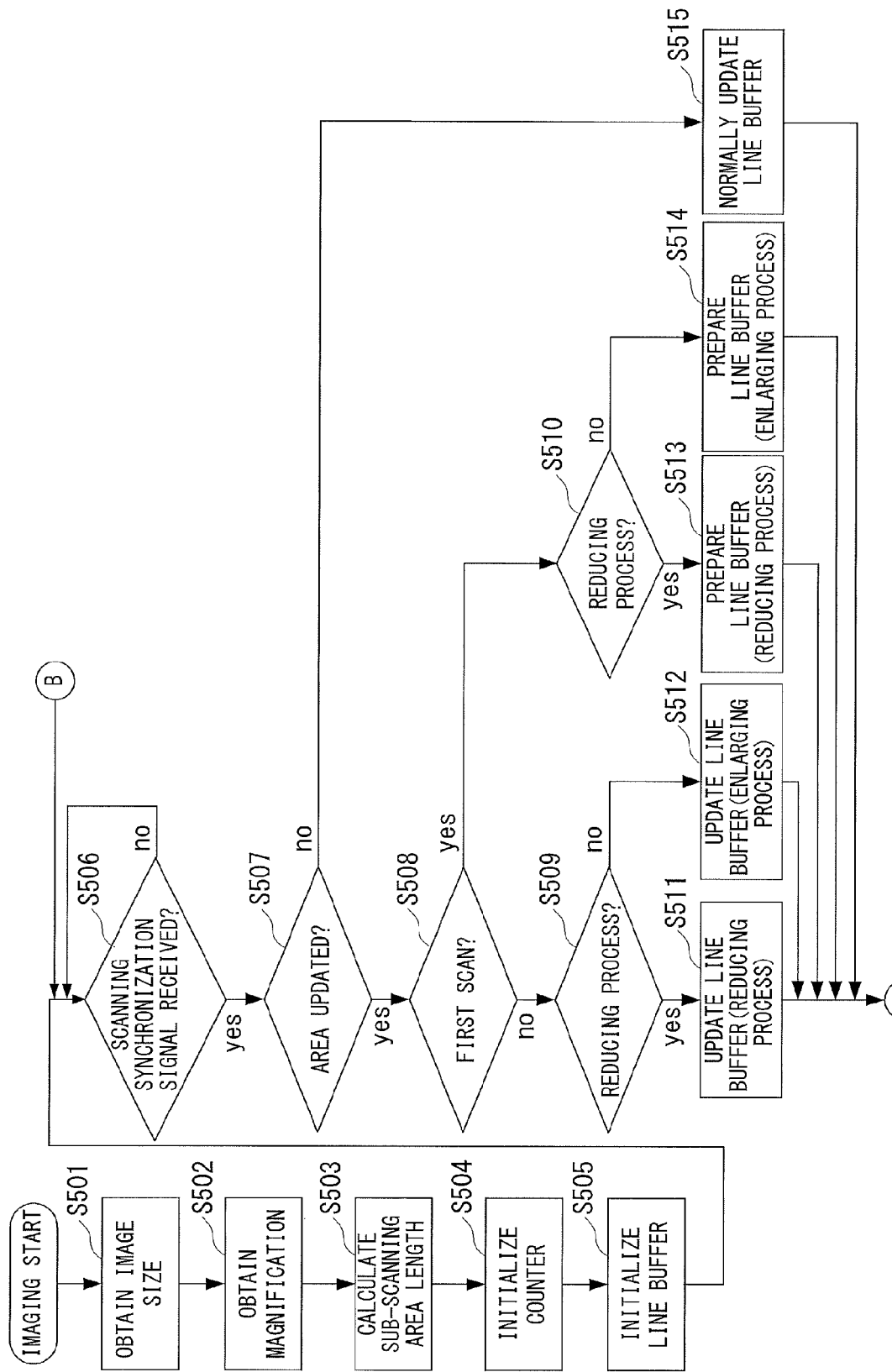
FIG. 4 is an exemplary flowchart illustrating procedures of a reducing or enlarging process.
Figure 5:
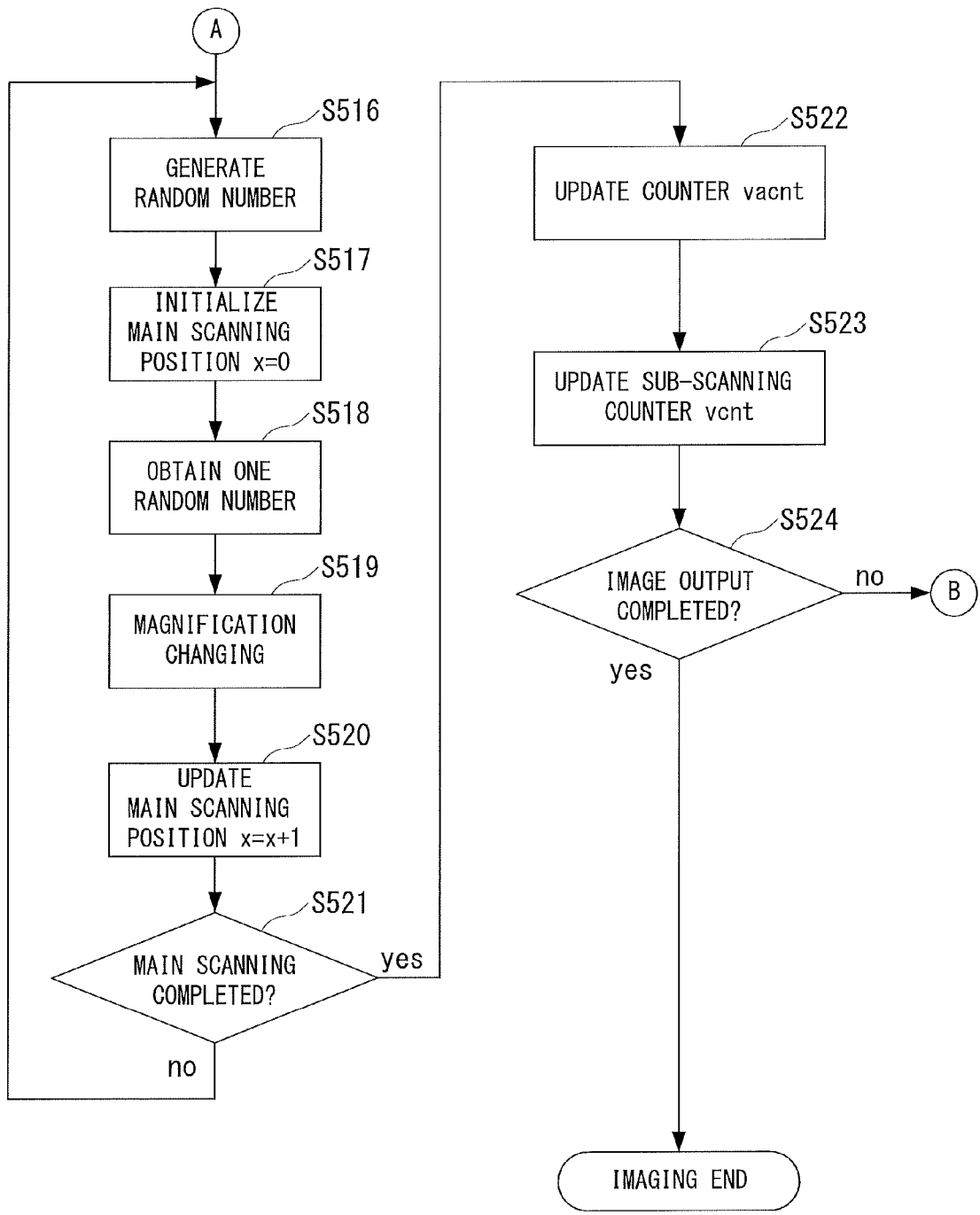
FIG. 5 is a flowchart continued from FIG. 4.

FIGS. 4 and 5 are exemplary flowcharts illustrating procedures of the reducing or the enlarging processes. First, the reducing process in the printer mode is explained. In response to receipt of the image data P and the image formation start signal P from the external PC 48, the image forming unit 110 starts imaging. It is noted that the input image received as the image data P is a set of pixels arranged in the main scanning direction and in the sub-scanning direction. Hereinafter, description is made in a case where a main scanning direction input image size in_x, which represents a length in the main scanning direction, is 14 pixels, and a sub-scanning direction input image size in_y, which represents a length in the sub-scanning direction, is 20 pixels. Further, in this case, a band process width d is 4 pixels (four lines), a magnification p is 90.9090 . . . [%], and the number L of lines of the line buffer 53 is set to 5 (i.e., d+1=4+1=5). Each line of the line buffer 53 is defined as line buffer L0, L1, L2, L3, and L4.

The CPU 51 obtains the image size (i.e., the value of the scanning direction input image size in_x, and the value of the sub-scanning direction input image size in_y) of the input image (S501). Specifically, the pixel sequence of the main scanning direction consists of 14 pixels, and the pixel sequence of the sub-scanning direction consists of 20 pixels. The CPU 51 obtains magnification information (i.e., the value of the magnification p) from the external PC 48 (S502). Specifically, the value is 90.9090 . . . [%]. The CPU 51 divides an input image along the sub-scanning direction, and calculates the number of pixels of a sub-scanning length ay for every divided area (S503). In a reducing process, ay can be obtained by the following formula 1, since one pixel is deleted from the pixel sequence of the sub-scanning direction in each area.

$$(ay-1)/ay=p/100 \quad \text{(formula 1)}$$

The formula 1 can be written as a following formula 2.

$$ay=100/(100-p) \quad \text{(formula 2)}$$

The sub-scanning length ay in the reducing process is set to ay=100/(100−90.9090 . . . )=11 [pixels]. This means that the deletion of one pixel is performed at a frequency of one time per 11 lines.

The CPU 51 initializes each of a sub-scanning counter vcnt and a counter vacnt (S504). The sub-scanning counter vcnt is provided for counting the total number of the output lines in an output image. Due to the process of step S504, the value of the sub-scanning counter vcnt is initialized to 0 (zero). The counter vacnt is provided for counting the number of the output lines in each area. The maximum value of the counter vacnt (max) in the reducing process is expressed as follows: vacnt (max)=ay−1−1. Since the initial value of the counter vacnt is "0", therefore, ay is subtracted by 1 (i.e., first "−1" in the above formula). Further, the initial sub-scanning length consists of 11 pixels while the current sub-scanning length consists of 10 pixels so that the area is terminated with lack of 1 pixel, therefore, ay is further subtracted by 1 (i.e., second "−1" in the above formula. It is noted that the Maximum value vacnt (max) for the counter vacnt in the enlarging process is as follows: vacnt (max)=ay−1+1. Details will be described later.

Since the band process width d consists of four lines, the number "4" is added to the value of the counter vacnt for every one scan (+4). However, because of addition, when the value of the maximum vacnt (max) is exceeded, restarting the count from "0" for the count in excess of the value of the maximum vacnt. Here, in the image data output from the band process, the 1st, 2nd, 3rd and 4th lines of the counter vacnt are defined as the counter vacnt (0), the counter vacnt (1), the counter vacnt (2) and the counter vacnt (3), respectively. After initializing the counter vacnt, the counter vacnt (0)=0, the counter vacnt (1)=1, the counter vacnt (2)=2, and the counter vacnt (3)=3.

The CPU 51 initializes line buffer 53 (S505). Specifically, all the buffers of the line buffers L0, L1, L2, L3, and L4 are overwritten by data 0. The CPU 51 determines whether the main scanning synchronization signal was received from the BD sensor 36 or not (S506). In response to receipt of the main scanning synchronization signal (S506: yes), the CPU 51 determines whether the area is updated or not, i.e., the process is started at new area or not (S507). Specifically, if any of the values of the count vacnt (0) to count vacnt (3) is 0, it is possible to determine that the area is updated. If it is determined that the area is updated (S507: yes), the process proceeds to Step S508. If not (S507: no), the process proceeds to Step S515.

The CPU 51 determines whether the output of an image is the first scanning (i.e., first time scan) or not (S508). Specifically, if the value of the sub-scanning counter vcnt is 0, it will determine that the output corresponds to the first scanning. If it is determined to be the first scan, (S508: yes), the process proceeds to Step S510. If not (S508: no), the process proceeds to S509. The CPU 51 determines, based on the value of the magnification p, whether the process is the reducing process or the enlarging process (S509). If it is determined to be the reducing process, (S509: yes), the process proceeds to Step S511. If not (S509: no), the process proceeds to S512. The CPU 51 determines, based on the value of the magnification p, whether the process is the reducing process or the enlarging process (S510). If it is determined to be the reducing process, (S510: yes), the process proceeds to Step S513. If not (S510: no), the process proceeds to Step S514.

The CPU 51 updates the line buffer 53 (S511). Specifically, the CPU 51 outputs the image data request signal P to the external PC 48 five times. Then, the image data for five lines, which is output from the external PC 48 in response to the image data request signal P, is stored in the line buffers L0, L1, L2, L3 and L4 in this order. The CPU 51 updates line buffer (S512). Specifically, the CPU 51 copies the image data stored in the line buffer L3, and stores the copied image data in the line buffer L0. Further, the CPU 51 copies the image data stored in the line buffer L4, and stores the copied image data in the line buffer L1. Then, the CPU 51 outputs the image data request signal P to the external PC 48 three times. Then, the CPU 51 stores the image data for three lines, which is output from the external PC 48 in response to the image data request signal P, in the line buffers L2, L3, and L4 in this order.

The CPU 51 prepares the line buffer 53 (S513). The process of step S513 is a process which stores the image data in the line buffer 53 in order to perform the reducing process in the first scan. Specifically, the CPU 51 outputs the image data request signal P to the external PC 48 five times. Then, the image data for five lines, which is output from the external PC 48 in response to the image data request signal P, is stored in the line buffers L0, L1, L2, L3 and L4 in this order. The CPU 51 prepares the line buffer (S514). The process of step S514 is a process which stores the image data in the line buffer 53 in order to perform the enlarging process in the first scan. Specifically, the CPU 51 overwrites the image data stored in the line buffer L0 with data 0 for clearing all data. The CPU outputs the image data request signal P to the external PC 48 four times. Then, the data for four lines, which is output from the external PC 48 in response to the image data request signal P, is stored in the line buffers L0, L1, L2, L3 and L4 in this order.

The CPU 51 updates the line buffer 53 (S515). Specifically, the CPU 51 copies the image data stored in the line buffer L4, and stores the copied image data in the line buffer L0. The CPU 51 outputs the image data request signal P to the external PC 48 four times. Then, the image data for four lines, which is output from the external PC 48 in response to the image data request signal P, is stored in the line buffers L0, L1, L2, L3 and L4 in this order.

Figure 6:
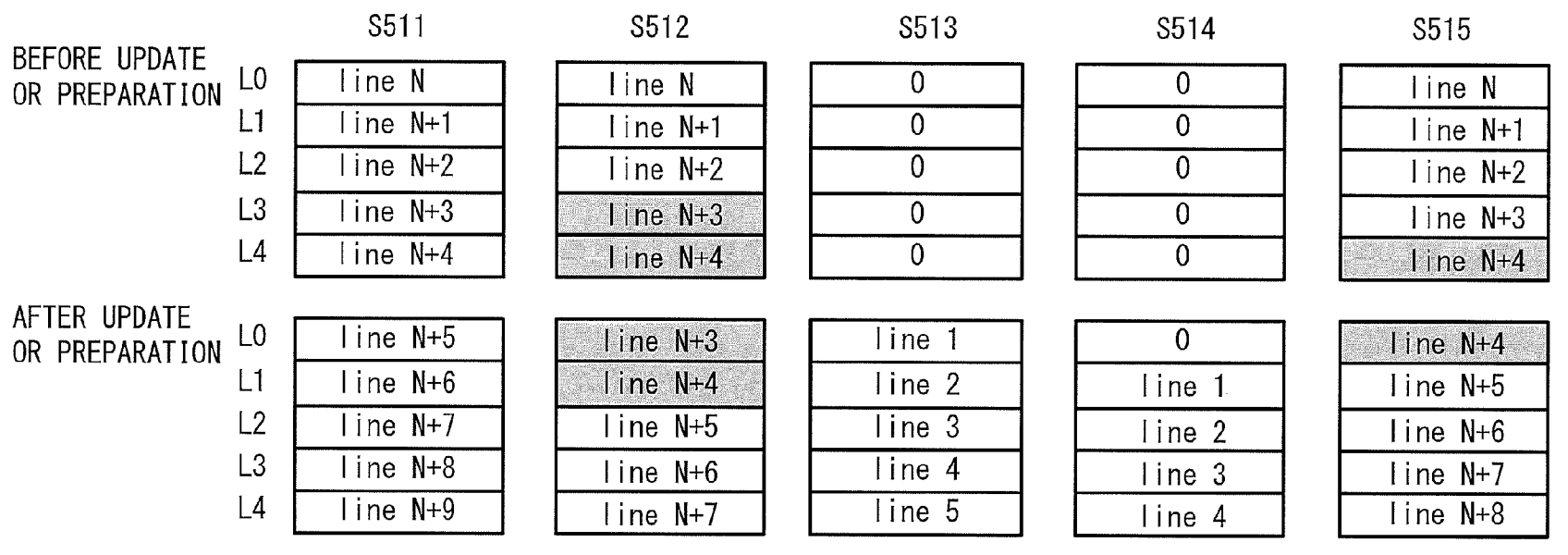

Here, description is made for the image data stored in each of line buffers L0, L1, L2, L3 and L4 before and after performing each process of steps S511 to S515. FIG. 6 is a schematic diagram illustrating the stored data in each of the line buffers L0, L1, L2, L3 and L4 before and after performing each of steps S511 to S515. In FIG. 6, the state before performing the process of each step is represented as "before updating/preparation", and the state after performing the process of each step is represented as "after updating/preparation". For example, "line1" illustrated in FIG. 6 represents the image data of the first line of the input image. Further, "N" illustrated in FIG. 6 represents arbitrary integers more than or equal to 1. "0 (data 0)" illustrated in FIG. 6 indicates that the value of all the data is "0" regardless of the input image. The shaded line in FIG. 6 represents the image data commonly used before and after the process. For example, in the process of step S512, it is "line N+3" and "line N+4".

Returning to FIG. 5, The CPU 51 generates random numbers rnd for all the main scanning positions in one scan (S516). In the image forming unit 110 of this embodiment, the range of the generated random number value rnd is defined by the maximum value and the minimum value. Further, the range is restricted to "0" to "the maximum value vacnt (max) of the counter vacnt–the band process width d+1". For example, when the value of the maximum vacnt (max) is 9 and the band process width d is 4, the CPU 51 restrict the range of a random number value rnd, which are used for specifying the random positions to "0" to "6". The details of the range of a random number value rnd are explained in the description for step S702 (FIG. 10), which is described later. Further, specific procedures for generating the random numbers are explained in the description for step S600 to step S607 (FIG. 8), which is described later.

Each process of step S517 to step S524 is an image processing in one scan. The CPU 51 initializes the main scanning position x to 0 (S505). The CPU 51 obtains the random number value rnd corresponding to the main scanning position x from the random number buffer 54 (S518). The CPU 51 performs a magnification changing process based on the obtained random number value rnd, the value of the magnification p and each value of the counter vacnt (0) to the counter vacnt (3) (S519). As to the specific procedures of the magnification changing process are explained in each process of step S700 to step S714 (FIG. 10) described later. The CPU 51 updates the main scanning position x (S520). Specifically, "1" is added (+1) to the value of main scanning position x. The CPU 51 compares the value of the main scanning position x with the value of the main scanning direction input image size in_x of the input image. Then, the CPU 51 determines whether the image processing has been performed for all the main scanning positions (S521). Specifically, when the condition "x in_x– 1" is satisfied, the CPU 51 determines that the image processing has been performed for all the main scanning positions. If it is determined that image processing has been performed for all the main scanning positions (S507: yes), the process proceeds to S522. If not (S521: no), the process proceeds to Step S518.

The CPU 51 updates the counter vacnt (S522). Specifically, adding "4" to each of the values of the count vacnt (0) to count vacnt (3). However, as described above, the maximum vacnt (max) of the counter vacnt at the time of the reducing process, vacnt (max)=ay−1−1. Therefore, when the maximum value is exceeded, restarting the count from "0" for the count in excess of the value of the maximum vacnt.

As an example, description is made in a case where update is performed with ay=11, vacnt (max)=9, vacnt (0)=5, vacnt (1)=6, vacnt (2)=7, and vacnt (3)=8. In this case, the counter vacnt (0) to the counter vacnt (3) are updated as shown in the following (a)-(d).

(a) (vacnt (0): 5+4=9, thus the vacnt (0)=9
(b) vacnt (1): 6+4=10, thus the vacnt (1)=0
(c) vacnt (2): 7+4=11, thus the vacnt (2)=1
(d) vacnt (3): 8+4=12, thus the vacnt (3)=2

Each value of the counter vacnt (0) to the counter vacnt (3) for each scan is illustrated in FIG. 7. As illustrated in FIG. 7, for example, the value of the counter vacnt (0) is "6" in the 5th scan, and "0" in the 6th scan.

The CPU 51 updates the sub-scanning counter vcnt (S523). Specifically, "4" is added (+4) to the value of the sub-scanning counter vcnt. The CPU 51 determines whether the output of the image has been completed or not (S524). The total number of the lines of the output image is obtained by multiplying the value of the sub-scanning direction input image size in_y by the value of the magnification p. Specifically, when "vcnt [in_y*p] ("[ ]" is a sign representing the largest integer not greater than the value inside "[ ]") is satisfied, it is determined that all the image outputs have been completed. When it is determined that all the image outputs have been completed (S524: yes), a series of imaging is completed. If not (S524: no), the process proceeds to Step S506 and the image processing for the next scan is performed. As for sub-scanning direction input image size in_y, the count starts from "1", and, as for sub-scanning counter vcnt, the count starts from "0".

Figure 8:
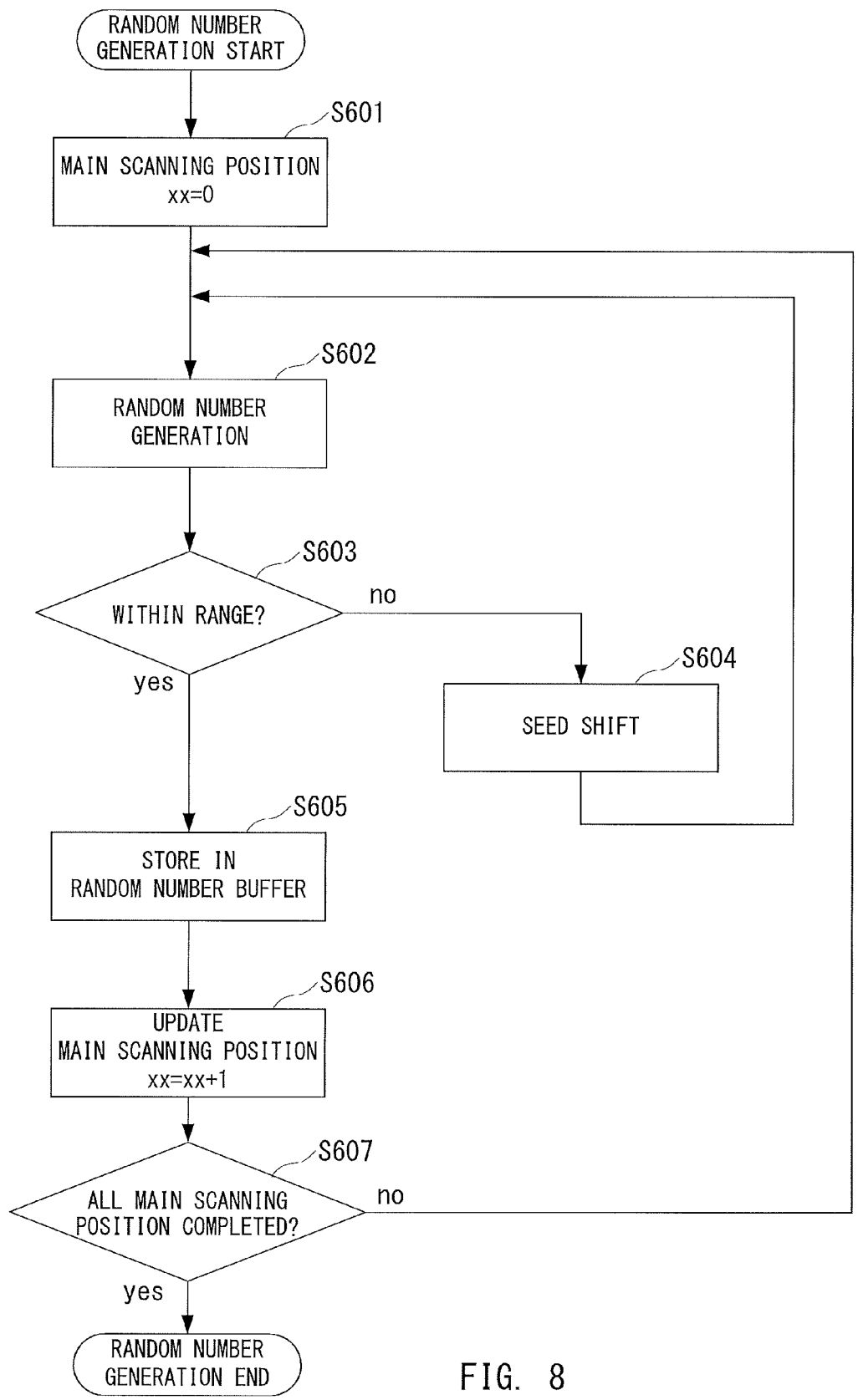
FIG. 8 is a flowchart illustrating a specific procedure for generating random values.
Figure 9A:
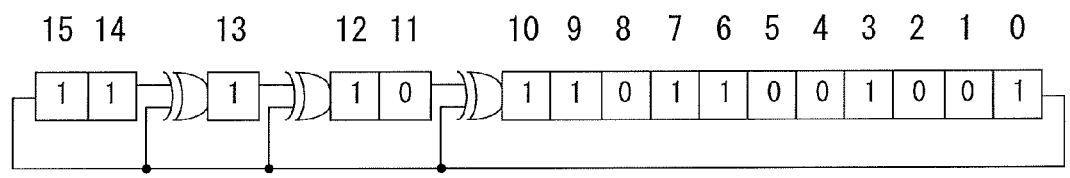
FIG. 9A is a diagram illustrating a principle of operation of a random number generator.
Figure 9B:
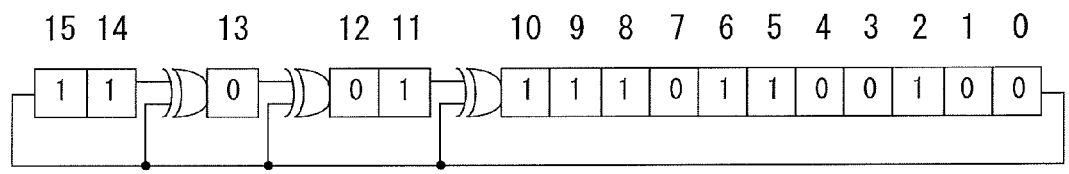
FIG. 9B illustrates the seed value of the random number output circuit after a shift.

Description is specifically made with regard to step S516. FIG. 8 is a flowchart exemplary illustrating a specific procedure in step S516 (procedures for generating random value rnd). The CPU 51 initializes the main scanning counter xx (XX=0) (S601). The CPU 51 generates one random number (S602). Here, the details of the random number value will be specifically described. In this embodiment, as an example of a random number output circuit, a circuit for generating a random number value based on pseudorandom number generation with the use of primitive polynomial is described. FIGS. 9A and 9B are the schematic diagrams illustrating a random number output circuit in which 16th primitive polynomial is embedded. The random number output circuit is configured by providing 16 binary recording elements in cascade connection and providing 3 logical operation circuits, each of which intervenes between the record elements. In these figures, two or more recording elements are defined as bit 15 to bit 0 (in FIG. 9A, it is indicated as "15, 14, . . . "), respectively. Further, an EXOR gate, which is an example of a logical operation circuit, intervenes between bit 14 and bit 13. Similarly, intervening EXOR gates are provided between bit 13 and bit 12, and between bit 11 and bit 10. A seed value serves as a species of a random number value. Further, the seed value is defined as a set of binary data of each bit of the random number output circuit.

Figure 19:
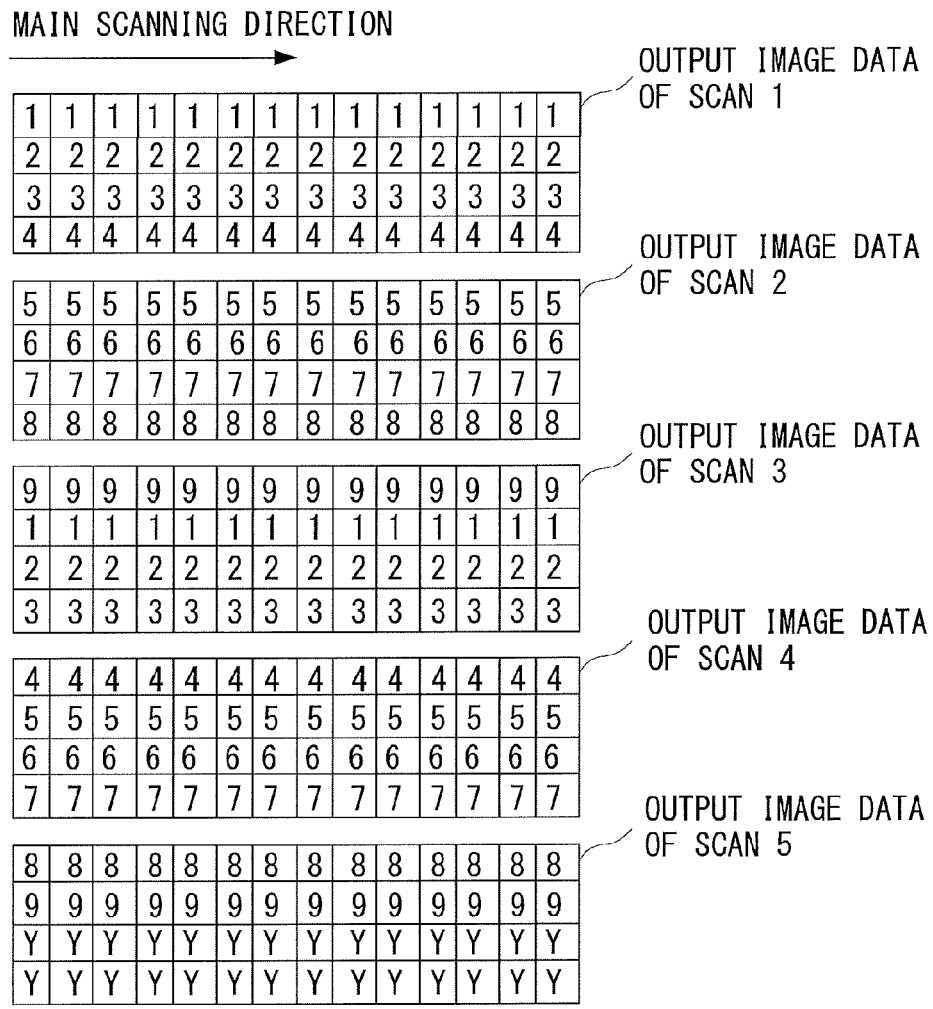
FIG. 19 is a diagram explaining as an example that an input image is output by the band process every four lines.
Figure 20:
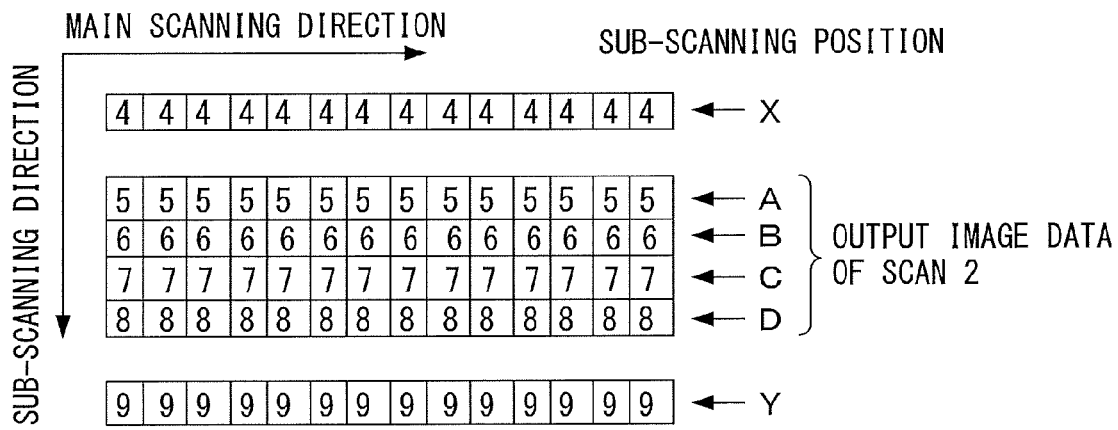
FIG. 20 is a diagram explaining the number of line buffers required for a magnification changing process.
Figure 21:
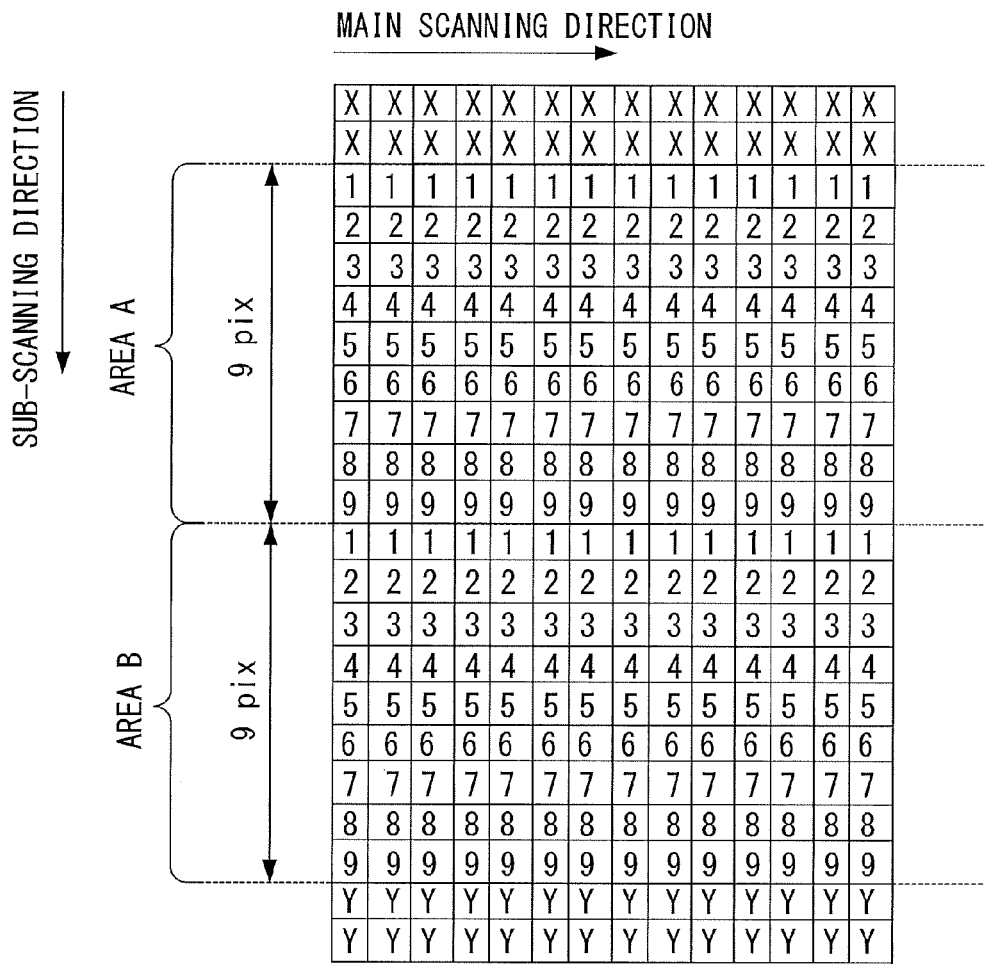
FIG. 21 is a diagram illustrating a part of an input image divided into areas.
Figure 22:
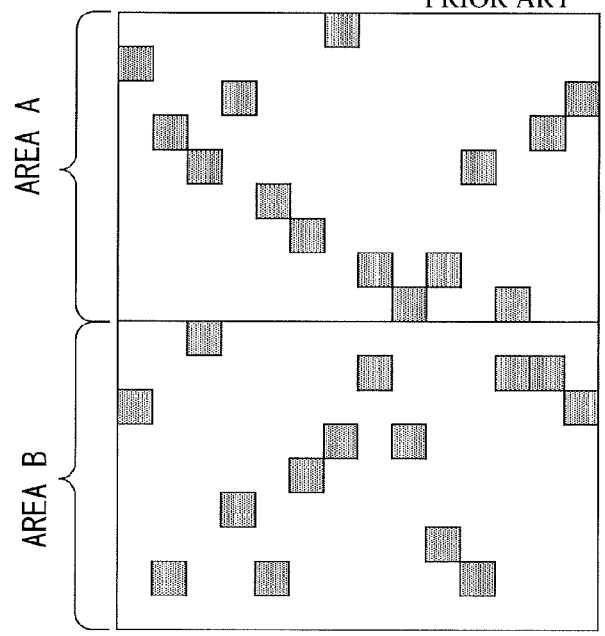
FIG. 22 is a diagram illustrating a state in which random positions, at which a pixel is deleted, are specified in an area A and an area B.
Figure 23:
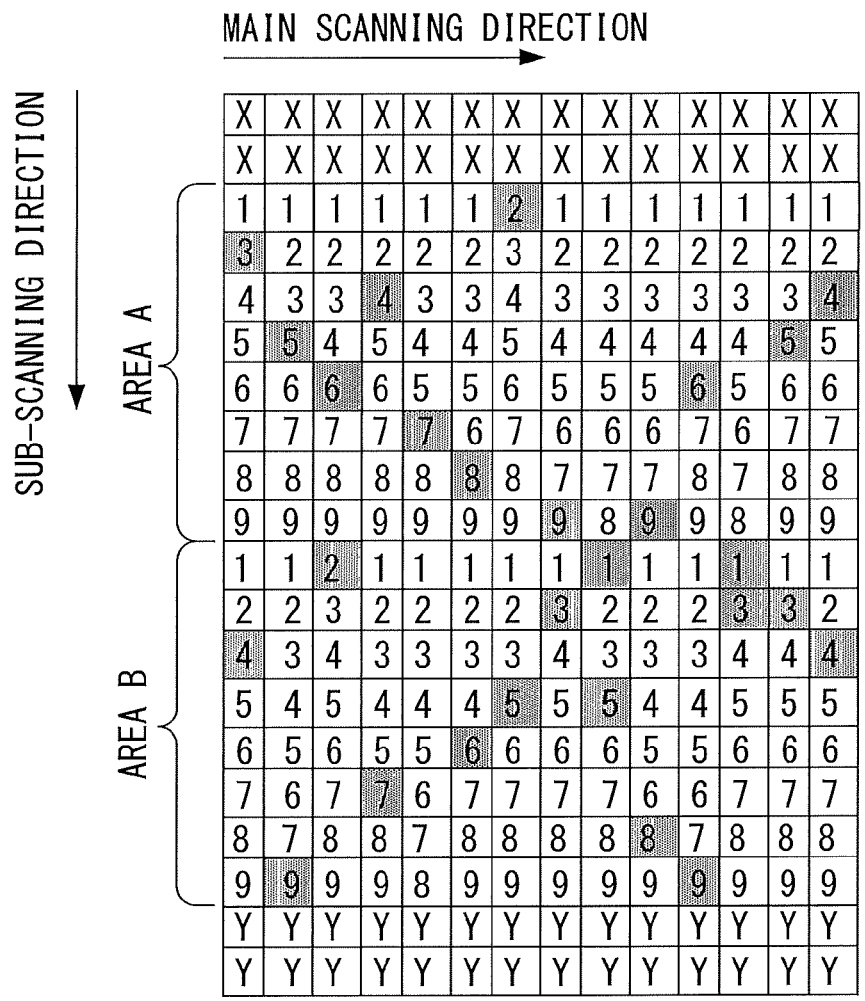
FIG. 23 is a diagram illustrating the result of the deletion of pixels at the positions illustrated in FIG. 22.

In FIG. 9A, the seed value of the random number output circuit is "1111011011001001". Here, description is made for finding the minimum index n which satisfies the condition "$2^n$ exceeds the maximum value of the random number". Since the maximum number of the random number value is 6, in this embodiment, n is found to be 3 (n=3). The value of this index n corresponds to the number of bits to be obtained from the random number output circuit illustrated in FIG. 19 for satisfying the above condition. In this embodiment, 3 bits, i.e., bit 2, bit 1 and bit 0 are obtained from the seed value.

For example, the generated random number value is determined based on the outputs of bit 2 to bit 0 of this seed value. In FIG. 9A, if the values of bit 2 to bit 0 are arranged in this order, the result is "001". By converting binary to decimal, from the above result, a random number value "1" is generated. When it is necessary to generate a random number value again, the binary data stored in the recording element is shifted in the predetermined direction to adjacent recording elements, thereby changing the seed value, and next random number value is generated based on the changed seed value. Specifically, the seed value for the random number output circuit is shifted rightward. The specific procedures for generating a random number value again, by shifting the seed value for the random number output circuit rightward, is as follows.

(a) Save the value of bit 0 in temporary variable temp (not shown).
(b) Assign the value of bit 1 to the value of bit 0.
(c) Assign the value of bit 2 to the value of bit 1.
(d) Assign the value of bit 3 to the value of bit 2.
(e) Assign the value of bit 4 to the value of bit 3.
(f) Assign the value of bit 5 to the value of bit 4.
(g) Assign the value of bit 6 to the value of bit 5.
(h) Assign the value of bit 7 to the value of bit 6.
(i) Assign the value of bit 8 to the value of bit 7.
(j) Assign the value of bit 9 to the value of bit 8.
(k) Assign the value of bit 10 to the value of bit 9.
(l) Assign the EXOR value of the value of the temporary variable temp and the value of bit 11 to the value of bit 10.
(m) Assign the value of bit 12 to the value of bit 11.
(n) Assign the EXOR value of the value of the temporary variable temp and the value of bit 13 to the value of bit 12.
(o) Assign the EXOR value of the value of the temporary variable temp and the value of bit 14 to the value of bit 13.
(p) Assign the value of bit 15 to the value of bit 14.
(q) Assign the value of the temporary variable temp to the value of bit 15.

Thus, by performing the processes (a) to (q), next random number value generated.

FIG. 9B illustrates the seed value for the random number output circuit after the shift. Here, as in the above example, the generated random number value is determined based on the outputs of bit 2 to bit 0 of this seed value. In FIG. 9B, if the values of bit 2 to bit 0 are arranged in this order, the result is "100". By converting binary to decimal, from the above result, a random number value "4" is generated.

Returning to FIG. 8, the CPU 51 determines whether the random number value rnd generated in the process of step S602 satisfies the determined range or not (S603). In this embodiment, it is determined whether the generated random number value rnd is within the range of "0" to "6." If the generated random number value rnd is out of the range (S603: no), the CPU 51 shifts the seed value for the random number output circuit (S604). Then, random number value rnd is again generated. If the generated random number value rnd is within the range (S603: yes), i.e., the generated random number value rnd is less than or equal to "6", the CPU 51 stores this random number value rnd in the random number buffer 54 (S605). Then, the CPU 51 increments the main scanning counter xx by 1 (S606). Specifically, the value of the main scanning counter xx will be as follows: xx=xx+1. The CPU 51 determines whether the generation of the random numbers for all the main scanning positions has completed or not (S607). As for main scanning direction input image size in_x, the count starts from "1", and, as for main scanning counter xx, the count starts from "0". When the condition "main scanning position xx main scanning direction input image size in_x−1" is satisfied, it is determined that the generation of the random number values corresponding to all the main scanning positions has completed. If it is determined that the generation has completed (S607: yes), the process proceeds to Step S608. If not (S607: no), the process returns to Step S602. Thus, all the random number values rnd corresponding to all the main scanning positions are stored in the random number buffer 54 through the processes of step S601 to step S607.

Figure 10:
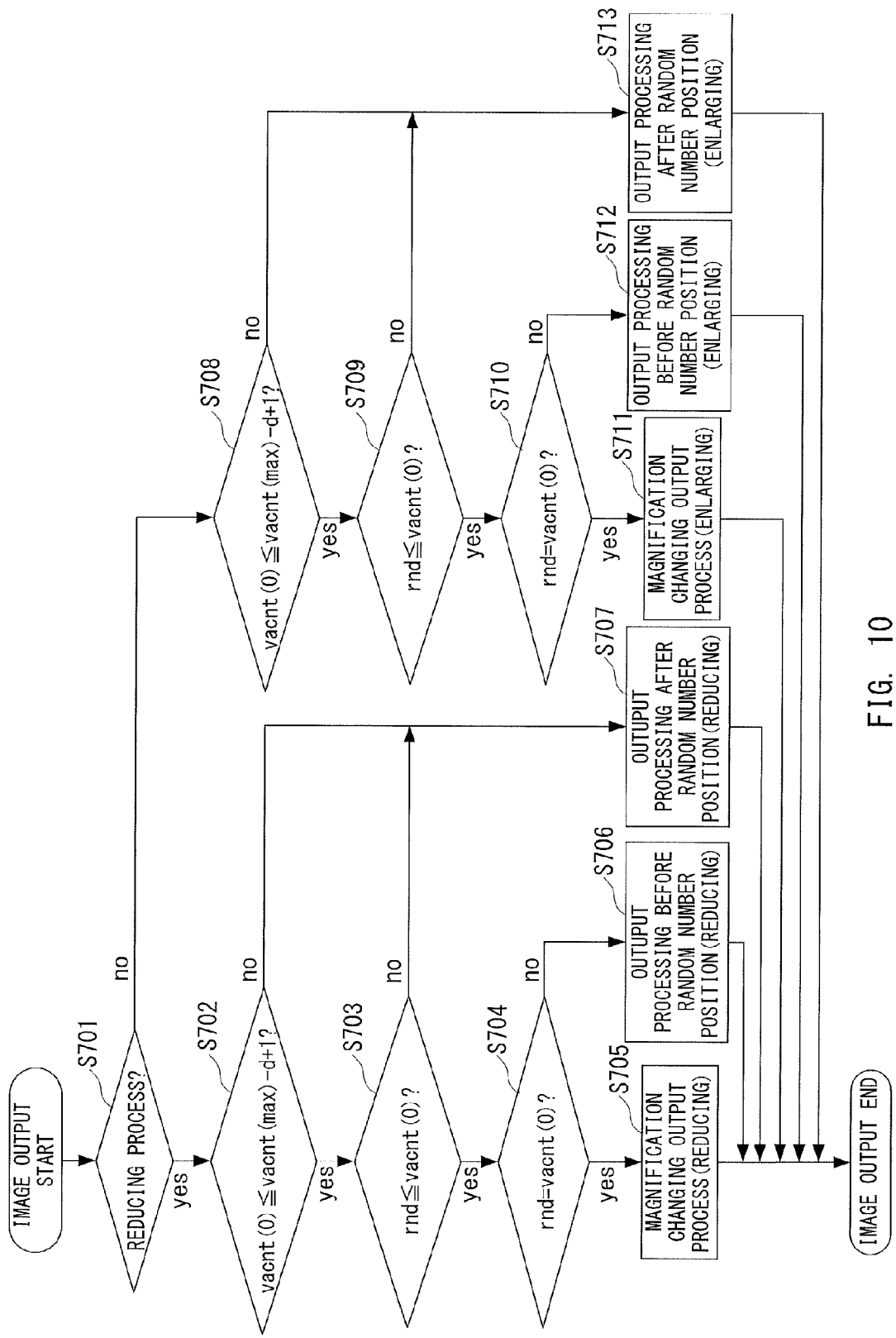
FIG. 10 is a flowchart illustrating an example of specific procedures of an image output process.

Description is specifically made with regard to step S519 illustrated in FIG. 5. FIG. 10 is a flowchart exemplary illustrating a specific procedure in step S519 (image output process). The procedures illustrated in FIG. 10 is performed on each of the counter vacnt (0), the counter vacnt (1), the counter vacnt (2), and the counter vacnt (3). That is, the process using the counter vacnt (0) determines the data of the 1st line of the output image, and the process using the counter vacnt (1) determines the data of the 2nd line of the output image. Further, the process using the counter vacnt (2) determines the data of the 3rd line, and the process using the counter vacnt (3) determines the data of the 4th line. Here, as for a typical example, description is made for the counter vacnt (0). It is noted the same applies to the counter vacnt (1), counter vacnt (2), and counter vacnt (3).

The CPU 51 determines, based on the value of the magnification p, whether the process is the reducing process or the enlarging process (S701). If it is determined to be the reducing process, (S701: yes), the process proceeds to Step S702. If not (S701: no), the process proceeds to Step S708. Here, since the process is a reducing process (S701: yes), the process proceeds to Step S702. It is noted that each process of step S708 to step S713 are performed in the enlarging process described later.

The CPU 51 compares the counter vacnt (0) with the sub-scanning length ay and the band process width d (S702) in an area. Specifically, when the formula "vacnt(0)≤vacnt(max)−d+1" is satisfied (S702: yes), the process proceeds to step S703. If not (S702: no), the process proceeds to S707. Here, "vacnt(max)−d+1" of the formula in step S702, i.e., "vacnt(0) vacnt(max)−d+1" is explained. When performing the band process near a boundary of the areas, the band process may be performed over two different areas. For example, in a single scan, the first line and the second line may belong one area (e.g., area A) while the third line and the fourth line may belong to another area (e.g., area B).

Figure 11:
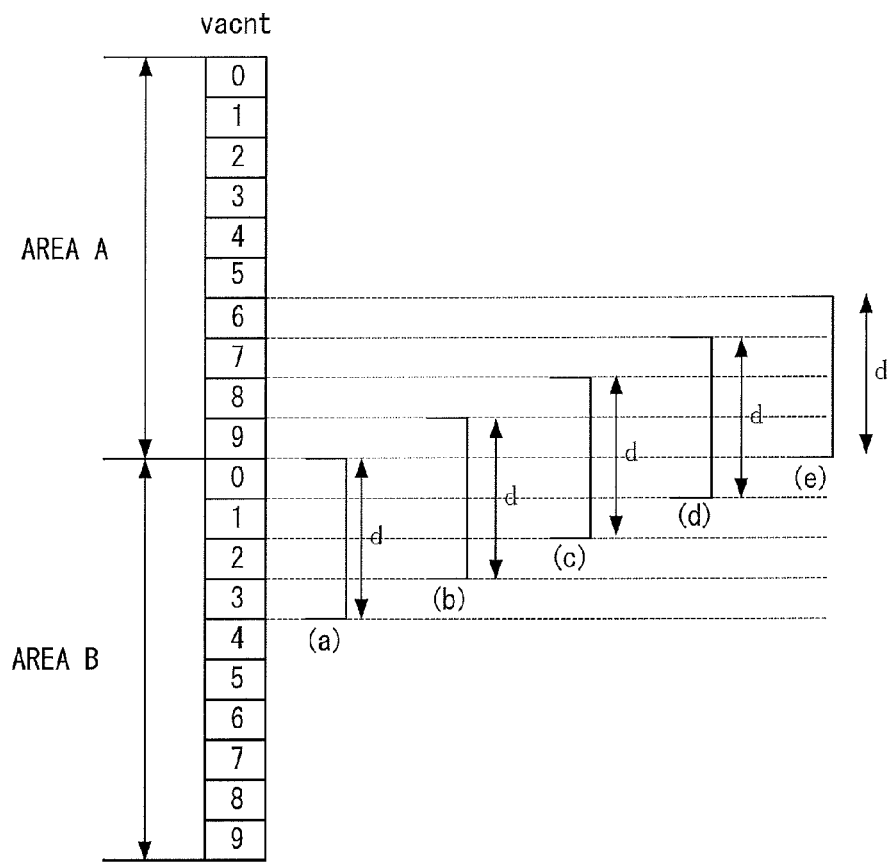
FIG. 11 is an exemplary diagram illustrating possible values of a counter vacnt when performing a scan over an area A and an area B.

FIG. 11 is an exemplary diagram illustrating possible values of the counter vacnt (0) to the counter vacnt (3) when performing a scan over an area A and an area B.

Since the band process width d consists of four lines, in the patterns (a) to (e) illustrated in FIG. 11, the values of the vacnt (0) to the vacnt (4) are as follows.

(a): vacnt (0)=0, vacnt (1)=1, vacnt (2)=2, vacnt (3)=3
(b): vacnt (0)=9, vacnt (1)=0, vacnt (2)=1, vacnt (3)=2

(c): vacnt (0)=8, vacnt (1)=9, vacnt (2)=0, vacnt (3)=1
(d): vacnt (0)=7, vacnt (1)=8, vacnt (2)=9, vacnt(3)=0
(e): vacnt (0)=6, vacnt (1)=7, vacnt (2)=8, vacnt(3)=9

In FIG. 11, each of the states (b), (c), and (d) is a pattern in which a process is performed over the area A and the area B. In this case, the value of the counter vacnt is "vacnt (max)−d+2≤vacnt≤vacnt (max)", with the maximum vacnt (max) of the counter vacnt at the time of the reducing process and the band process width d as variables. In the configuration employed in a known image forming apparatus, all the sub-scanning positions in an area can be the position at which an insertion or a deletion of a pixel occurs. Further, a random number value rnd may be generated in the range of "0≤rnd≤ay−1", and a single scan may be performed over two areas. In this case, it is necessary to compare a counter vacnt with a random number value rnd for each of the area A and the area B. That is, it will be necessary to store and maintain a random number value for both areas. Further, when processing is performed over two areas, a deletion of a pixel may be performed twice in the same main scanning position. An example of this case will be described in detail with reference to FIG. 12.

Figure 12:
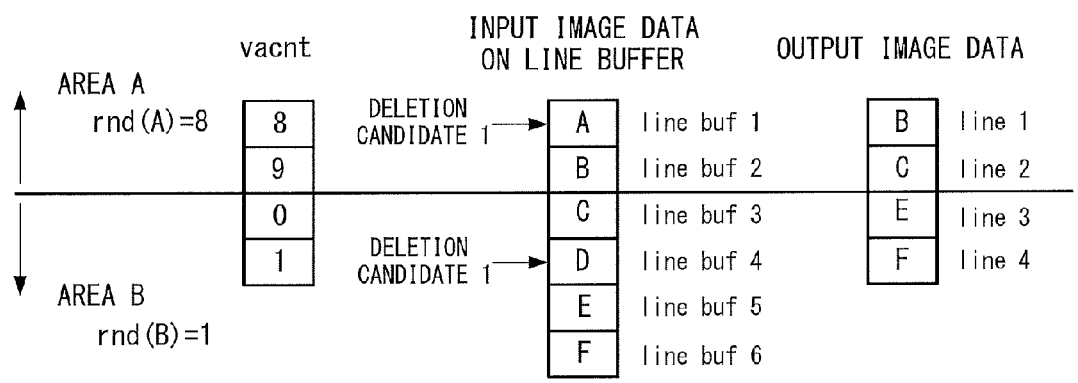
FIG. 12 is an exemplary diagram explaining a relation of a line buffer and an output image in a reducing process.

FIG. 12 is a diagram explaining a relation of a line buffer and an output image in an exemplary reducing process. In the reducing process, a main scanning position x is 5 (x=5), a random number value for the area A is 8, and a random number value for the area B is 1. In FIG. 12, the random number value rnd (A) for the area A is "8", and the random number value rnd (B) of the area B is "1". For this reason, two pixels, i.e., a deletion candidate 1 (linebuf1 (A)) and a deletion candidate 2 (linebuf4 (D)), which are on the same main scanning line, are deleted. In an output image, the line buffers are shifted by 2 pixels in the sub-scanning direction, therefore, the output image consists of line 1 (B), line 2 (C), line 3 (E), and line 4 (F), as illustrated in FIG. 12. That is, in the reducing process in this case, the number L of the line buffer 53 needs to be the sum of the band process width d and 2 lines, i.e., d+2 lines.

In the image forming apparatus 110 of this embodiment, the range of a random number value rnd is restricted. For example, the range of a random number value rnd is controlled so that a pixel which is a target of an insertion or a deletion performed in a process performed in scans before the scan over the area A and the area B. As a result, in the scan over the area A and the area B, a random number value rnd for the area A is no longer needed, and only a random number value rnd for the area B is needed. Further, in one scan, two or more deletions of a pixel in the same main scanning position do not occur. Therefore, "d+2" lines are sufficient for the number of line buffer 53. As illustrated in FIG. 11, the range of random number value rnd is "0≤rnd≤vacnt (max)−d+1". By satisfying this condition, in the process of step S702, even if the condition "vacnt (0) vacnt (max)−d+1" is not filled, it is not necessary to refer to the random number value for the area A, and the process can proceed to the process of step S707.

Returning to FIG. 10, the CPU 51 compares 1) the value of the random number value rnd corresponding to the main scanning position x which is obtained by the process of step S518 (FIG. 5) with 2) the value of the counter vacnt (0) (S703). When the result is "rnd≤vacnt (0)", (S703: yes), the process proceeds to step S704. If not (S703: no), the process proceeds to Step S707. The CPU 51 compares 1) the value of the random number value rnd corresponding to the main scanning position x which is obtained by the process of step S518 (FIG. 5) with 2) the value of the counter vacnt (0) (S704). When the result is "rnd=vacnt (0)", (S704: yes), the process proceeds to step S705. If not (S704: no), the process proceeds to Step S706.

The CPU 51 performs a reducing process (magnification changing output process) (S705). Specifically, in the process concerning the counter vacnt (0), the data corresponding to the main scanning position x is obtained from the line buffer L1 and it is output. In the process concerning the counter vacnt (1), the data corresponding to the main scanning position x is obtained from the line buffer L2, and it is output. In the process concerning the counter vacnt (2), the data corresponding to the main scanning position x is obtained from the line buffer L3, and it is output. In the process concerning the counter vacnt (3), the data corresponding to the main scanning position x is obtained from the line buffer L4, and it is output. Due to these processes, in each position of the area which is specified by the random number value rnd, 1 pixel is deleted.

The CPU 51 performs output processing before the random number position (S705). The output processing before the random number position in this case is the normal image output process which does not perform a magnification changing process in the reducing process. Specifically, in the process concerning the counter vacnt (0), the data corresponding to the main scanning position x is obtained from the line buffer L0 and it is output. In the process concerning the counter vacnt (1), the data corresponding to the main scanning position x is obtained from the line buffer L1, and it is output. In the process concerning the counter vacnt (2), the data corresponding to the main scanning position x is obtained from the line buffer L2, and it is output. In the process concerning the counter vacnt (3), the data corresponding to the main scanning position x is obtained from the line buffer L3, and it is output.

The CPU 51 performs output processing after the random number position (S707). In this case, the reducing process has already been performed before the area including the count vacnt (0) to the count vacnt (3). Due to this, in the output processing after the random number position, the pixel at one line advanced position is output. Specifically, in the process concerning the counter vacnt (0), the data corresponding to the main scanning position x is obtained from the line buffer L1 and it is output. In the process concerning the counter vacnt (1), the data corresponding to the main scanning position x is obtained from the line buffer L2, and it is output. In the process concerning the counter vacnt (2), the data corresponding to the main scanning position x is obtained from the line buffer L3, and it is output. In the process concerning the counter vacnt (3), the data corresponding to the main scanning position x is obtained from the line buffer L4, and it is output.

Figure 13:
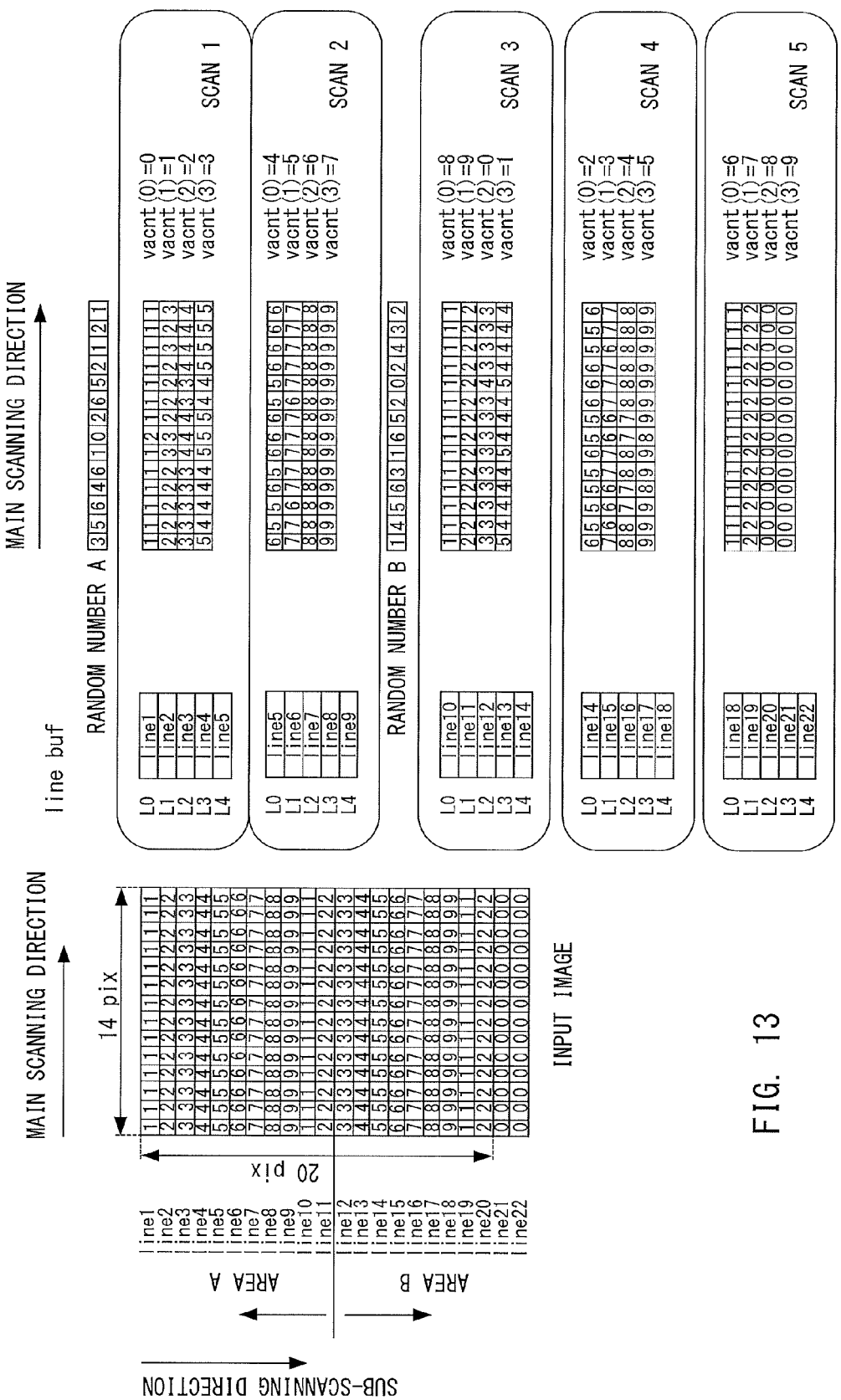
FIG. 13 is an exemplary diagram explaining a reducing process.

FIG. 13 is an exemplary diagram explaining a reducing process of this embodiment. In FIG. 13, the input image, the image data to be stored in each of the line buffers L0, L1, L2, L3 and L4, and the random number value (A, B) are schematically illustrated. Further, in FIG. 13, the output image data and the values of counter vacnt (0) from the vacnt (3) are illustrated and arranged for each scan (from scan 1 to scan 5).

Now, the enlarging process in the printer mode is explained. Fundamental process procedures are followed according to the case of the reducing process. Hereinafter, description is made focusing on the process procedures which differ from process procedures in the case of the reducing process. Further, description is made in a case where a main scanning direction input image size in_x is 14 pixels, and a sub-scanning direction input image size in_y is 20 pixels, the band process width d is 4 pixels (4 lines), and the magnification P is 111.1111 . . . [%]. In addition, the line number L of the line buffers 53 is 5 (d+1=4+1=5), and each line of the line buffer 53 is defined as a line buffer L0, L1, L2, L3, and L4.

In the process in step S502 (FIG. 4), the CPU 51 obtains the magnification information (i.e., the value of the magnification p) from the external PC 48. Specifically, the value is 111.111111 . . . [%]. In the process in step 503 (FIG. 4), The CPU 51 divides an input image along the sub-scanning direction, and calculates the number of pixels of a sub-scanning length ay for every divided area. In the enlarging process, ay can be obtained by the following formula 3, since one pixel is inserted from the pixel sequence of the sub-scanning direction in each area.

$$(ay+1)/ay=p/100 \qquad \text{(formula 3)}$$

The formula 3 can be written as a following formula 4.

$$ay=100/(p-100) \qquad \text{(formula 4)}$$

The sub-scanning length ay in the enlarging process is set to ay=100/(111.111111−100)=9 [pixels]. This means that the insertion of one pixel is performed at a frequency of one time per 9 lines.

In the process of step S522 (FIG. 5), the CPU 51 updates the counter vacnt (S522). Specifically, adding "4" to each of the values of the count vacnt (0) to count vacnt (3). However, as described above, the maximum vacnt (max) of the counter vacnt at the time of the enlarging process, vacnt (max)=ay−1+1. Therefore, when the maximum value is exceeded, restarting the count from "0" for the count in excess of the value of the maximum vacnt. As an example, description is made in a case where update is performed with ay=11, vacnt (max)=9, vacnt (0)=5, vacnt (1)=6, vacnt (2)=7, and vacnt (3)=8.

In this case, the counter vacnt (0) to the counter vacnt (3) are updated as shown in the following (a)-(d):
 (a) vacnt (0): 5+4=9, thus the vacnt (0)=9:
 (b) vacnt (1): 6+4=10, thus the vacnt (1)=0;
 (c) vacnt (2): 7+4=11, thus the vacnt (2)=1;
 (d) vacnt (3): 8+4=12, thus the vacnt (3)=2.

Description is specifically made with regard to step S519 illustrated in FIG. 5 in the enlarging process with reference to FIG. 10. As in the reducing process, for each of the counter vacnt (0), the counter vacnt (1), the counter vacnt (2), and the counter vacnt (3), the process is performed in the enlarging process. In the process of step S701 (FIG. 10), the CPU 51 determines, based on the value of the magnification p, whether the process is the reducing process or the enlarging process (S510). Here, since the process is an enlarging process (S701: no), the process proceeds to Step S708 (FIG. 10). Description is made with regard to each of steps S708 to S713.

The CPU 51 compares the counter vacnt (0) with the sub-scanning length ay and the band process width d in each area (S708). Specifically, when the formula "vacnt (0)≤vacnt (max)−d+1" is satisfied (S708: yes), the process proceeds to step S709. If not (S708: no), the process proceeds to Step S713. The CPU 51 compares 1) the value of the random number value rnd corresponding to the main scanning position x which is obtained by the process of step S518 (FIG. 5), with 2) the value of the counter vacnt (0) (S709). When the result is "rnd≤vacnt (0)", (S709: yes), the process proceeds to step S710. If not (S709: no), the process proceeds to Step S713. The CPU 51 compares 1) the value of the random number value rnd corresponding to the main scanning position x which is obtained by the process of step S518 (FIG. 5) with 2) the value of the counter vacnt (0) (S710). When the result is "rnd=vacnt(0)", (S710: yes), the process proceeds to step S711. If not (S710: no), the process proceeds to Step S712.

The CPU 51 performs an enlarging process (magnification changing output process) (S711). Specifically, in the process concerning the counter vacnt (0), the data corresponding to the main scanning position x is obtained from the line buffer L0 and it is output. In the process concerning the counter vacnt (1), the data corresponding to the main scanning position x is obtained from the line buffer L1, and it is output. In the process concerning the counter vacnt (2), the data corresponding to the main scanning position x is obtained from the line buffer L2, and it is output. In the process concerning the counter vacnt (3), the data corresponding to the main scanning position x is obtained from the line buffer L3, and it is output. Due to these processes, in each position of the area which is specified by the random number value rnd, 1 pixel is inserted.

The CPU 51 performs output processing before the random number position (S712). The output processing before the random number position in this case is the normal image output process which does not perform a magnification changing process in the enlarging process. Specifically, in the process concerning the counter vacnt (0), the data corresponding to the main scanning position x is obtained from the line buffer L1 and it is output. In the process concerning the counter vacnt (1), the data corresponding to the main scanning position x is obtained from the line buffer L2, and it is output. In the process concerning the counter vacnt (2), the data corresponding to the main scanning position x is obtained from the line buffer L3, and it is output. In the process concerning the counter vacnt (3), the data corresponding to the main scanning position x is obtained from the line buffer L4, and it is output.

The CPU 51 performs output processing after the random number position (S713). In this case, the enlarging process has already been performed before the area including the count vacnt (0) to the count vacnt (3). Due to this, in the output processing after the random number position, the pixel at one line behind position is output. Specifically, in the process concerning the counter vacnt (0), the data corresponding to the main scanning position x is obtained from the line buffer L0 and it is output. In the process concerning the counter vacnt (1), the data corresponding to the main scanning position x is obtained from the line buffer L1, and it is output. In the process concerning the counter vacnt (2), the data corresponding to the main scanning position x is obtained from the line buffer L2, and it is output. In the process concerning the counter vacnt (3), the data corresponding to the main scanning position x is obtained from the line buffer L3, and it is output.

Figure 14:
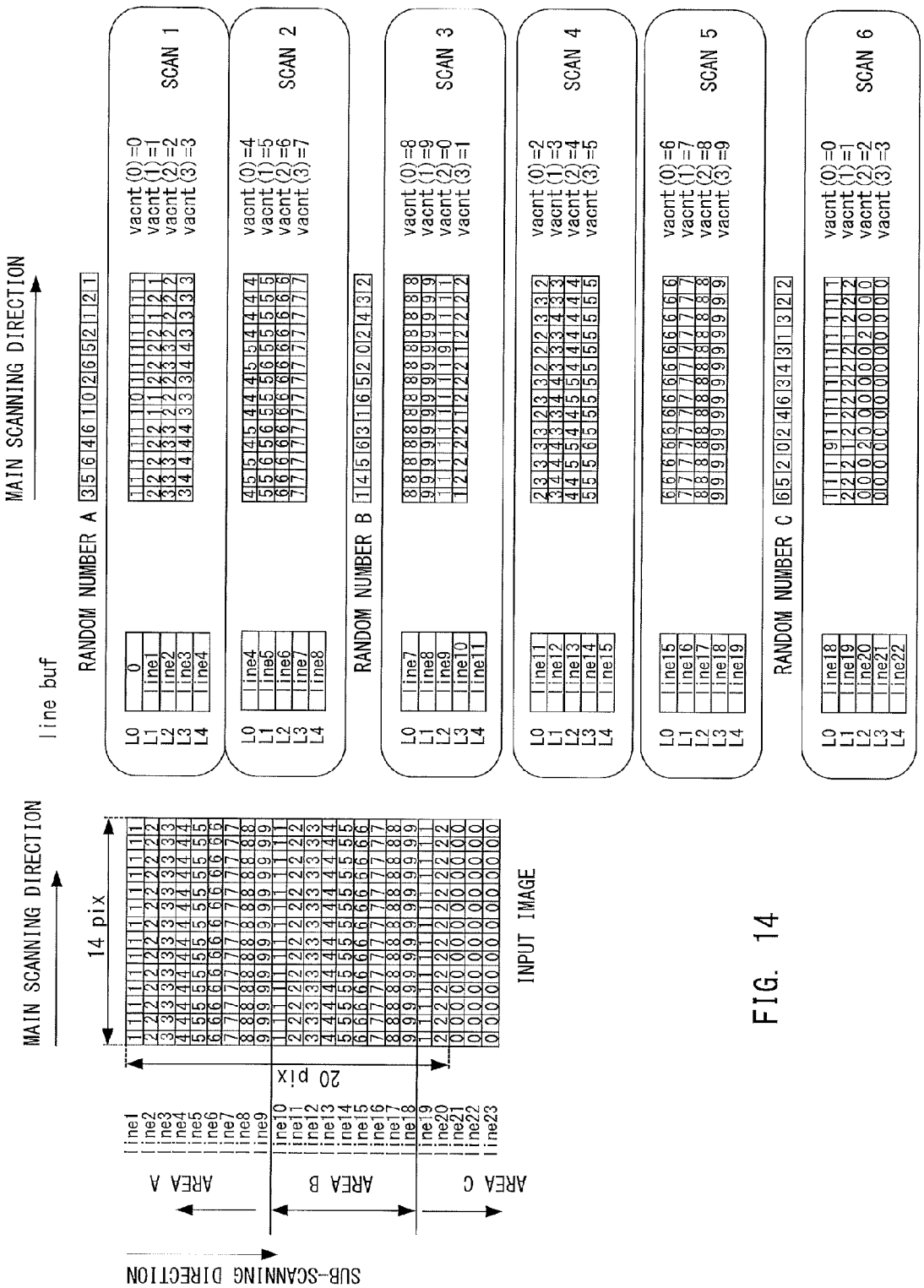
FIG. 14 is an exemplary diagram explaining an enlarging process.
Figure 15:
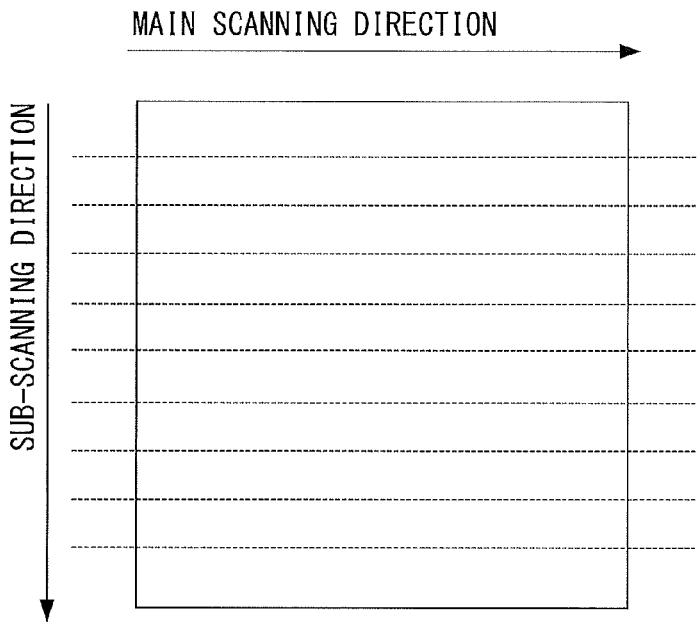
FIG. 15 is a diagram exemplifying area division of the input image.
Figure 16:
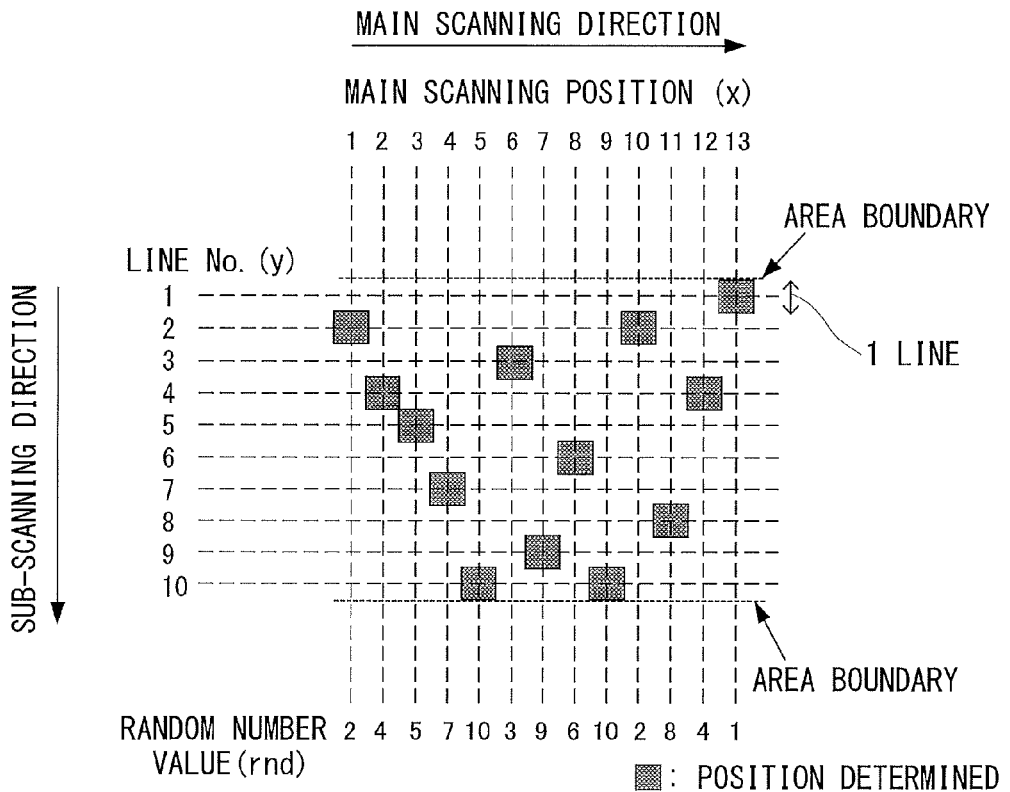
FIG. 16 is a diagram explaining determination of a random position at which a pixel is inserted or deleted.
Figure 17A:
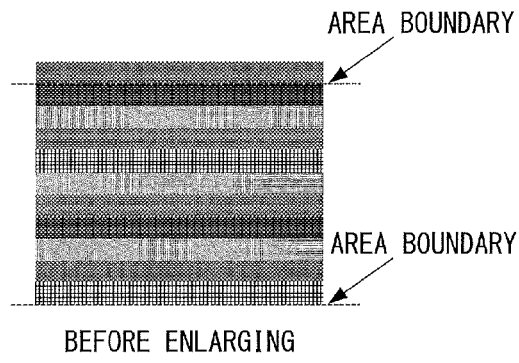
FIG. 17A is a diagram illustrating an input image before enlarging.
Figure 17B:
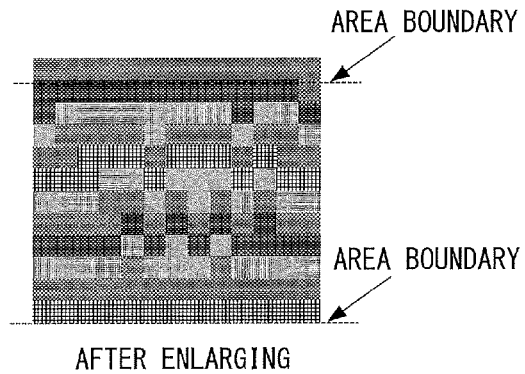
FIG. 17B is a diagram illustrating an image after enlarging.
Figure 17C:
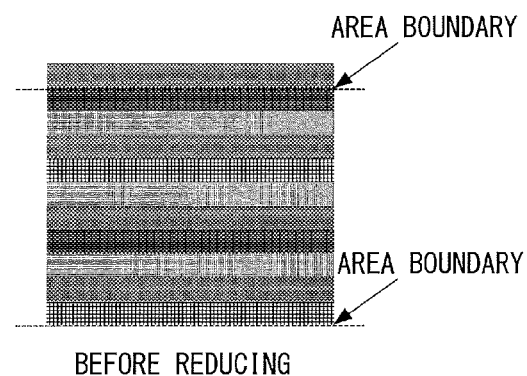
FIG. 17C is a diagram illustrating an input image before reduction.
Figure 17D:
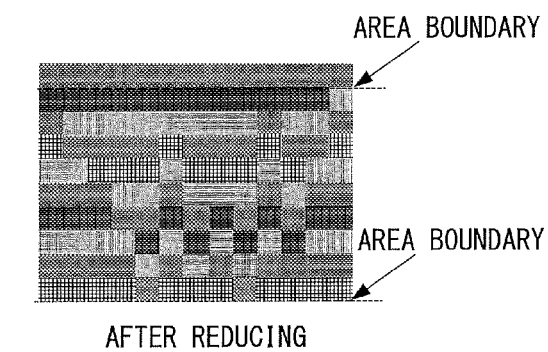
FIG. 17D is a diagram illustrating an image after reduction.
Figure 18:
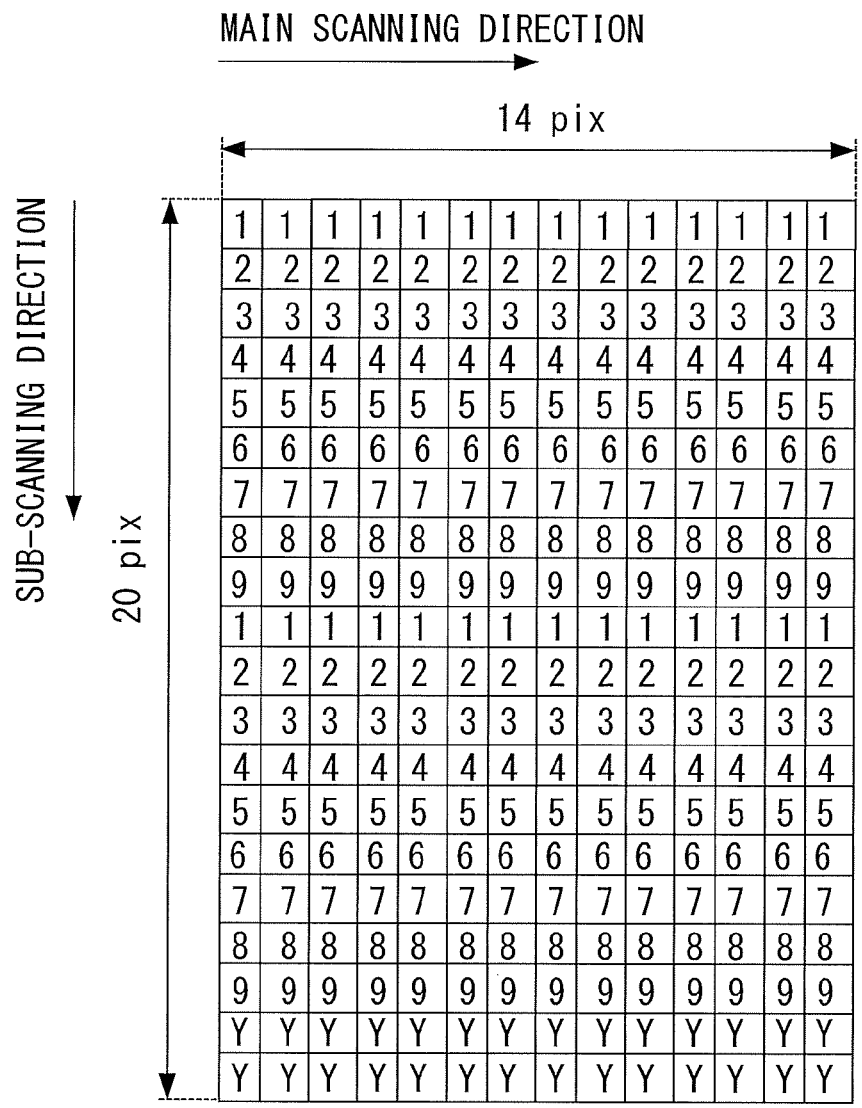
FIG. 18 is a diagram illustrating an exemplification of an input image.

FIG. 14 is an exemplary diagram explaining an enlarging process of this embodiment. In FIG. 14, the input image (areas A, B and C), the image data to be stored in each of the line buffers L0, L1, L2, L3 and L4, and the random number value (A, B and C) are schematically illustrated. Further, in FIG. 14, the output image data and the values of counter vacnt (0) from the vacnt (3) are illustrated and arranged for each scan (from scan 1 to scan 6).

It is noted that even if the image forming apparatus 110 is in the copy mode, the reducing process or the enlarging process is performed similar to the case in the printer mode. The copy mode differs from the printer mode in a point that the image forming apparatus 110, for transmitting or receiving signals and various data, does not communicate with the external PC 48, rather, it communicates with the panel 49, scanner unit 4 and image sensor 9. In this case, the image formation start signal P in the printer mode is replaced with the image formation start signal C in the copy mode. The magnification P in the printer mode is replaced with the magnification C in the copy mode. The image data request signal P in the printer mode is replaced with the image data request signal C in the copy mode. The image data P in the printer mode is replaced with the image data request signal C in the copy mode.

Thus, in the image forming apparatus 110 of this embodiment, the CPU 51 determines the range of a random number value rnd, which is generated by the random number generator, based on the scanning width (i.e., band process width d) and the length (i.e., sub-scanning length ay) in the direction of the sub-scanning in the area. Specifically, a generated random number value rnd is restricted within the range of "0" to "maximum vacnt (max) of the counter vacnt−band process width d+1" from "0". The image forming apparatus 110 receives a random number value rnd, which is in the above range, and performs image processing by inserting a pixel, or by deleting a pixel, at the position determined by the received random number value rnd. Thereby 1) the number L of the line buffer 53 which is required when performing a magnification changing process, and 2) the number of the random number generation circuits can be reduced. Further, the reduction of the manufacture cost of the image forming apparatus 110 can be achieved. In the reduction processing, since vacnt (max)=ay−1−1, "maximum vacnt (max) of the counter vacnt−band process width d+1" is expressed as "sub-scanning length ay−band process width d−1". That is, this value is less than or equal to the value obtained by subtracting the value of the band width d from the value of the sub-scanning length ay and further subtracting "1" (−1). In the enlarging processing, since vacnt (max)=ay−1+1, "maximum vacnt (max) of the counter vacnt−band process width d+1" is expressed as "sub-scanning length ay−band process width d+1". That is, this value is less than or equal to the value obtained by subtracting the value of the band width d from the value of the sub-scanning length ay and further adding "1" (+1).

In the above embodiment, description is made in a case where the value of sub-scanning length ay of each divided area is constant. Not restricted to this, the values of the sub-scanning length ay may differ in each area. In this case, in the formula based on the value of the sub-scanning length ay, the value of the sub-scanning length ay of the area to be processed may be used. Further, the sub-scanning length ay may not be an integer (i.e., having fractional part), for example, the calculated result ay may be 10.5. In this case, an area with ay=10 and an area with ay=11 are alternately provided for accommodating the sub-scanning length.

Further, in the above embodiments, when a random number value rnd generated in each process of steps S602 to S604 illustrated in FIG. 8 is out of the determined range, generation flows are repeated until a random number value rnd which is within the range. In addition, the number of bits may be determined so that the generated random number value should be within the range. For example, when the range of a random number value rnd is determined to be 0 to 6, in place of finding the minimum index n which satisfies the condition "2$^n$" exceeds the maximum value of the random number". the maximum index n which satisfies the condition "2$^n$" does not exceed the maximum value of the random number" may be found. In this case, n is determined to be 2 (n=2), this means that a random number value with 2 bits is generated. That is, the range within which a random number value rnd is generated is 0 to 3. In this case, since a generated random number value rnd is certainly smaller than the maximum value 6, the process of step S604 (FIG. 8) is eliminated.

In the expansion process, since an insertion of a pixel is performed, unlike the case where a pixel is deleted, when inserting a pixel, it is not necessary to prepare new data. However, when the input image is input per the fixed number of lines and if the data is of a type in which the data cannot be read after reading out, it has an effect of reducing line buffers. In the image forming apparatus of such a configuration, it is necessary to store data shifted in the behind position in the enlarging process in a line buffer. That is, since an insertion of a pixel may be performed 2 times in one scan, the image data for two lines may be necessary for the following scan. Therefore, by restricting a random number value rnd within a range of "0" to "the maximum value vacnt (max) of the counter vacnt−the band process width d+1", the number of lines of line buffers can be reduced.

As mentioned above, according to the present disclosure, a range of a generated random number value is determined according to a length of scanning width and a sub-scanning direction of an area. When performing image processing, a pixel is inserted at a position defined based on a random number value which is within the range, or a pixel at the position is deleted. Therefore, a random value used in an image processing is restricted to be within a determined range. Thus, the number of random number generation circuits and the required number of line buffers when performing a magnification changing process are reduced. Further, the reduction of the manufacture cost of an image forming apparatus may be achieved.

The present invention has been described in detail by way of the above-mentioned embodiments, but the scope of the present invention is not limited to those embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-071949, filed Mar. 31, 2014 which is hereby incorporated by reference wherein in its entirety.

What is claimed is:

1. An image forming apparatus configured to form an electrostatic image on a photosensitive member to be rotated, to develop the electrostatic image using toner, and to transfer the developed toner image onto a recording medium to form an image on the recording medium, the image forming apparatus comprising:
   a scanner unit configured to form the electrostatic image on the photosensitive member by performing a number of scans with a light beam in a main-scanning direction intersecting with a sub-scanning direction, which is perpendicular to a rotating axis of the photosensitive member, and based on a plurality of line data which includes a plurality of pixel data of pixels arranged in the main scanning direction; and
   a processor configured to generate the plurality of line data based on an input image data and to correct the plurality of line data based on a magnification data which represents an amount of magnification correction, wherein the processor is further configured:

to generate a random number value, to obtain, based on the magnification data, 1) a number of a line data of the plurality of line data to be added for magnification correction for enlarging magnification of the line data in the sub-scanning direction, or 2) a number of a line data of the plurality of line data to be deleted for magnification correction for reducing magnification of the line data in the sub-scanning direction, to divide the plurality of line data generated based on the input image data into a plurality of groups including the plurality of line data based on the number of the line data to be added or deleted, to determine a range of the random number value based on the magnification data for specifying a position for inserting or deleting a pixel for each divided group, and to perform image processing for inserting a pixel into the line data at the specified position specified by the random number value within the determined range so that at least one line data is added to the plurality of line data in each of the plurality of groups, or for deleting a pixel from the line data at the specified position specified by the random number value within the determined range so that at least one line data is deleted from the plurality of line data in each of the plurality of groups, so that each of the plurality of groups is enlarged or reduced, respectively.

2. The image forming apparatus according to claim 1, wherein:

the input image data is a set of pixels arranged in the main-scanning direction and in the sub-scanning direction of the image, and the range determined by the processor is a range in which, in each of a sequence of the pixels which is parallel to the sub-scanning direction in each of the plurality of groups, two or more deletions or insertions of a pixel in each of the number of scans at one time does not occur.

3. The image forming apparatus according to claim 1, wherein the processor is further configured to determine the range of the random number value when a scan is performed over the plurality of the groups at one time.

4. The image forming apparatus according to claim 1, wherein the processor is further configured to:
1) determine whether each of the number of scans at one time is performed over the plurality of the groups or not; and
2) determine, when each of the number of scans is performed on the plurality of the groups, the range of the random number value is determined such that two or more deletions or insertions of a pixel do not occur in the range.

5. The image forming apparatus according to claim 1, wherein the processor is further configured to determine the range of the random number value when performing the image processing for reducing or enlarging the image in the sub-scanning direction.

6. The image forming apparatus according to claim 5, wherein the processor is further configured to determine the range of the random number value such that a first range and a second range differ from each other, and:
1) the first range is the range of the random number value in a case where the image processing for reducing the image in the sub-scanning direction is performed; and
2) the second range is the range of the random number value in a case where the image processing for enlarging the image in the sub-scanning direction is performed.

* * * * *